(12) United States Patent
Yamashita

(10) Patent No.: US 9,565,351 B2
(45) Date of Patent: Feb. 7, 2017

(54) REMOTE IMAGING METHOD AND REMOTE IMAGING CONTROL DEVICE

(71) Applicant: Panasonic Intellectual Property Management Co., Ltd., Osaka (JP)

(72) Inventor: Kazuhiko Yamashita, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 50 days.

(21) Appl. No.: 14/716,905

(22) Filed: May 20, 2015

(65) Prior Publication Data

US 2015/0350520 A1 Dec. 3, 2015

(30) Foreign Application Priority Data

May 27, 2014 (JP) ................................. 2014-109443

(51) Int. Cl.
*H04N 5/232* (2006.01)
*H04N 1/00* (2006.01)
(Continued)

(52) U.S. Cl.
CPC ........ *H04N 5/23206* (2013.01); *G06F 21/305* (2013.01); *G06F 21/31* (2013.01);
(Continued)

(58) Field of Classification Search
CPC ............ H04N 5/23206; H04N 1/00244; H04N 1/00209; H04N 5/23222; H04N 4/021; H04N 21/2187; H04N 67/16; H04N 21/2343; H04N 21/25841; G06F 21/305; G06F 21/31
See application file for complete search history.

(56) References Cited

U.S. PATENT DOCUMENTS

2009/0249077 A1 10/2009 Gargaro et al.
2014/0056172 A1 2/2014 Lee et al.
(Continued)

FOREIGN PATENT DOCUMENTS

EP 1705880 9/2006
JP 11-215421 8/1999
(Continued)

OTHER PUBLICATIONS

The Extended European Search Report dated Oct. 23, 2015 for the related European Patent Application No. 15169161.5.

*Primary Examiner* — Joel Fosselman
*Assistant Examiner* — Fayez Bhuiyan
(74) *Attorney, Agent, or Firm* — Greenblum & Bernstein, P.L.C.

(57) ABSTRACT

A remote imaging method includes: continuously imaging a person having an operating terminal in an imaging spot by a camera; obtaining a display content displayed on a screen of the operating terminal during the continuous imaging; determining whether or not the operating terminal has imaging authority with the camera using the obtained display content; and sending a specified timing image taken by the camera at imaging timing specified by the operating terminal determined to have the imaging authority to the operating terminal. The determining further includes assessing whether the obtained display content and temporal transition of the obtained display content make a predetermined pattern is carried out, and when an assessment result is positive, the determining determines that the operating terminal has the imaging authority, and the predetermined pattern is to display each authentication image on the display of the operating terminal for display time predefined in an order predefined.

21 Claims, 17 Drawing Sheets

(51) Int. Cl.
*G06F 21/30* (2013.01)
*G06F 21/31* (2013.01)
*G06F 21/36* (2013.01)
*H04W 12/06* (2009.01)
*G06K 9/00* (2006.01)

(52) U.S. Cl.
CPC ......... *G06F 21/36* (2013.01); *H04N 1/00209* (2013.01); *H04N 1/00244* (2013.01); *H04W 12/06* (2013.01); *G06K 9/00671* (2013.01)

(56) References Cited

U.S. PATENT DOCUMENTS

2014/0218544 A1* 8/2014 Senot .................... H04W 4/021
348/207.1
2015/0049909 A1* 2/2015 Mori ....................... G06T 11/00
382/103

FOREIGN PATENT DOCUMENTS

JP 2007-318333 12/2007
WO 2013/145900 10/2013

* cited by examiner

FIG. 8

| TIME AND DATE INFORMATION | OPERATING TERMINAL ID |
|---|---|
| ⋮ | ⋮ |
| 03 / 10 / 2014 11:00 | TE10 |
| 03 / 10 / 2014 11:10 | TE11 |
| 03 / 10 / 2014 11:20 | |
| 03 / 10 / 2014 11:30 | TE9 |
| 03 / 10 / 2014 11:40 | TE3 |
| ⋮ | ⋮ |

| DISPLAY NUMBER | IMAGE INFORMATION | DISPLAY TIME |
|---|---|---|
| 1 | BLUE | 300 MILLISECONDS |
| 2 | RED | 600 MILLISECONDS |
| 3 | YELLOW | 200 MILLISECONDS |
| 4 | GREEN | 700 MILLISECONDS |
| 5 | PURPLE | 400 MILLISECONDS |
| 6 | LIGHT BLUE | 500 MILLISECONDS |
| 7 | BLUE | 200 MILLISECONDS |
| 8 | GREEN | 300 MILLISECONDS |
| 9 | RED | 600 MILLISECONDS |
| 10 | YELLOW | 200 MILLISECONDS |

| DISPLAY NUMBER | IMAGE INFORMATION | DISPLAY TIME AND DATE INFORMATION | DISPLAY TIME |
|---|---|---|---|
| 1 | BLUE | 03/10/2014 11:20:00.00 TO 03/10/2014 11:20:00.30 | 300 MILLISECONDS |
| 2 | RED | 03/10/2014 11:20:00.30 TO 03/10/2014 11:20:00.90 | 600 MILLISECONDS |
| 3 | YELLOW | 03/10/2014 11:20:00.90 TO 03/10/2014 11:20:01.10 | 200 MILLISECONDS |
| 4 | GREEN | 03/10/2014 11:20:01.10 TO 03/10/2014 11:20:01.80 | 700 MILLISECONDS |
| 5 | PURPLE | 03/10/2014 11:20:01.80 TO 03/10/2014 11:20:02.20 | 400 MILLISECONDS |
| 6 | LIGHT BLUE | 03/10/2014 11:20:02.20 TO 03/10/2014 11:20:02.70 | 500 MILLISECONDS |
| 7 | BLUE | 03/10/2014 11:20:02.70 TO 03/10/2014 11:20:02.90 | 200 MILLISECONDS |
| 8 | GREEN | 03/10/2014 11:20:02.90 TO 03/10/2014 11:20:03.20 | 300 MILLISECONDS |
| 9 | RED | 03/10/2014 11:20:03.20 TO 03/10/2014 11:20:03.80 | 600 MILLISECONDS |
| 10 | YELLOW | 03/10/2014 11:20:03.80 TO 03/10/2014 11:20:04.00 | 200 MILLISECONDS |

| IMAGING NUMBER | IMAGE INFORMATION | IMAGING TIME AND DATE INFORMATION | IMAGING TIME |
|---|---|---|---|
| 1 | RED | 03/10/2014 11:20:02.00 TO 03/10/2014 11:20:02.20 | 200 MILLISECONDS |
| 2 | YELLOW | 03/10/2014 11:20:02.20 TO 03/10/2014 11:20:02.40 | 200 MILLISECONDS |
| 3 | GREEN | 03/10/2014 11:20:02.40 TO 03/10/2014 11:20:03.10 | 700 MILLISECONDS |
| 4 | PURPLE | 03/10/2014 11:20:03.10 TO 03/10/2014 11:20:03.50 | 400 MILLISECONDS |
| 5 | LIGHT BLUE | 03/10/2014 11:20:03.50 TO 03/10/2014 11:20:04.00 | 500 MILLISECONDS |
| 6 | BLUE | 03/10/2014 11:20:04.00 TO 03/10/2014 11:20:04.20 | 200 MILLISECONDS |
| 7 | GREEN | 03/10/2014 11:20:04.20 TO 03/10/2014 11:20:04.50 | 300 MILLISECONDS |

| DISPLAY NUMBER | IMAGE INFORMATION | DISPLAY TIME |
|---|---|---|
| 1 | BLUE | 300 MILLISECONDS |
| 2 | RED | 600 MILLISECONDS |
| 3 | YELLOW | 200 MILLISECONDS |
| 4 | GREEN | 700 MILLISECONDS |
| 5 | PURPLE | 400 MILLISECONDS |
| 6 | LIGHT BLUE | 500 MILLISECONDS |
| 7 | BLUE | 200 MILLISECONDS |
| 8 | GREEN | 300 MILLISECONDS |
| 9 | RED | 600 MILLISECONDS |
| 10 | YELLOW | 200 MILLISECONDS |

1202

| IMAGING NUMBER | IMAGE INFORMATION | IMAGING TIME |
|---|---|---|
| 1 | RED | 200 MILLISECONDS |
| 2 | YELLOW | 200 MILLISECONDS |
| 3 | GREEN | 700 MILLISECONDS |
| 4 | PURPLE | 400 MILLISECONDS |
| 5 | LIGHT BLUE | 500 MILLISECONDS |
| 6 | BLUE | 200 MILLISECONDS |
| 7 | GREEN | 300 MILLISECONDS |

| DISPLAY NUMBER | IMAGE INFORMATION | | | DISPLAY TIME |
|---|---|---|---|---|
| | A | B | C | |
| 1 | 20% | 50% | 30% | 300 MILLISECONDS |
| 2 | 30% | 20% | 50% | 600 MILLISECONDS |
| 3 | 40% | 40% | 20% | 200 MILLISECONDS |
| 4 | 50% | 10% | 40% | 700 MILLISECONDS |
| 5 | 60% | 20% | 20% | 400 MILLISECONDS |
| 6 | 10% | 60% | 30% | 500 MILLISECONDS |
| 7 | 20% | 30% | 50% | 200 MILLISECONDS |
| 8 | 30% | 40% | 30% | 300 MILLISECONDS |
| 9 | 50% | 30% | 20% | 600 MILLISECONDS |
| 10 | 20% | 70% | 10% | 200 MILLISECONDS |

| DISPLAY NUMBER | IMAGE INFORMATION | | | DISPLAY TIME AND DATE INFORMATION | DISPLAY TIME |
|---|---|---|---|---|---|
| | A | B | C | | |
| 1 | 20% | 50% | 30% | 03/10/2014 11:20:00.00 TO 03/10/2014 11:20:00.30 | 300 MILLISECONDS |
| 2 | 30% | 20% | 50% | 03/10/2014 11:20:00.30 TO 03/10/2014 11:20:00.90 | 600 MILLISECONDS |
| 3 | 40% | 40% | 20% | 03/10/2014 11:20:00.90 TO 03/10/2014 11:20:01.10 | 200 MILLISECONDS |
| 4 | 50% | 10% | 40% | 03/10/2014 11:20:01.10 TO 03/10/2014 11:20:01.80 | 700 MILLISECONDS |
| 5 | 60% | 20% | 20% | 03/10/2014 11:20:01.80 TO 03/10/2014 11:20:02.20 | 400 MILLISECONDS |
| 6 | 10% | 60% | 30% | 03/10/2014 11:20:02.20 TO 03/10/2014 11:20:02.70 | 500 MILLISECONDS |
| 7 | 20% | 30% | 50% | 03/10/2014 11:20:02.70 TO 03/10/2014 11:20:02.90 | 200 MILLISECONDS |
| 8 | 30% | 40% | 30% | 03/10/2014 11:20:02.90 TO 03/10/2014 11:20:03.20 | 300 MILLISECONDS |
| 9 | 50% | 30% | 20% | 03/10/2014 11:20:03.20 TO 03/10/2014 11:20:03.80 | 600 MILLISECONDS |
| 10 | 20% | 70% | 10% | 03/10/2014 11:20:03.80 TO 03/10/2014 11:20:04.00 | 200 MILLISECONDS |

FIG. 19

| DISPLAY NUMBER | IMAGE INFORMATION | | | IMAGING TIME AND DATE INFORMATION | IMAGING TIME |
|---|---|---|---|---|---|
| | A | B | C | | |
| 1 | 30% | 20% | 50% | 03/10/2014 11:20:02.00 TO 03/10/2014 11:20:02.20 | 200 MILLISECONDS |
| 2 | 40% | 40% | 20% | 03/10/2014 11:20:02.20 TO 03/10/2014 11:20:02.40 | 200 MILLISECONDS |
| 3 | 50% | 10% | 40% | 03/10/2014 11:20:02.40 TO 03/10/2014 11:20:03.10 | 700 MILLISECONDS |
| 4 | 60% | 20% | 20% | 03/10/2014 11:20:03.10 TO 03/10/2014 11:20:03.50 | 400 MILLISECONDS |
| 5 | 10% | 60% | 30% | 03/10/2014 11:20:03.50 TO 03/10/2014 11:20:04.00 | 500 MILLISECONDS |
| 6 | 20% | 30% | 50% | 03/10/2014 11:20:04.00 TO 03/10/2014 11:20:04.20 | 200 MILLISECONDS |
| 7 | 30% | 40% | 30% | 03/10/2014 11:20:04.20 TO 03/10/2014 11:20:04.50 | 300 MILLISECONDS |

REMOTE IMAGING METHOD AND REMOTE IMAGING CONTROL DEVICE

BACKGROUND

1. Technical Field

The present disclosure relates to a remote imaging method and a remote imaging control device to carry out imaging using a remotely operable camera placed at an imaging spot.

2. Description of the Related Art

A service is under review in which a camera is placed at a location where a user desires imaging including him/herself as a part of a subject, such as a location of an excellent view in a tourist attraction, a theme park, and the like, (hereinafter, referred to as "an imaging spot") to let the user image with the camera and provide the taken image. By using the service, a user is capable of obtaining a nicer picture with less camera shake than imaging using a camera that him/herself has and the like, so that it is possible to enhance the level of satisfaction of the user. In the meanwhile, a provider of such a high value added service generally desires to charge for utilization of a service and to limit use of the camera only to users that have paid a usage fee. In an example of a system to provide such service, an operating terminal (remote controller) in which a number of possible shots is stored is rented to a user that has paid a usage fee to allow imaging with a camera within a range of the number of possible shots only by an instruction from the operating terminal (for example, refer to Japanese Unexamined Patent Application Publication No. 11-215421).

SUMMARY

In one general aspect, the techniques disclosed here feature a remote imaging method executed by an imaging system carrying out imaging by a camera placed at an imaging spot, the method including: continuously imaging a person having an operating terminal in the imaging spot by the camera; obtaining a display content displayed on a display of the operating terminal from a plurality of taken images taken by the continuous imaging; determining whether or not the operating terminal has imaging authority using the camera using the obtained display content; and sending a specified timing image taken by the camera at timing for imaging specified by the operating terminal determined to have the imaging authority to the operating terminal, in which the determining further includes assessing whether or not the obtained display content and temporal transition of the obtained display content make a predetermined pattern is carried out, and when an assessment result is positive, the determining determines that the operating terminal has the imaging authority, and the predetermined pattern is to display each of a plurality of authentication images on the display of the operating terminal for display time defined in advance in an order defined in advance.

With the above configuration, it is possible that the remote imaging method according to the present disclosure allows imaging with a camera as secure as possible only when an operating terminal that is determined to have imaging authority is within an imaging region of a camera.

It should be noted that general or specific embodiments may be implemented as a system, a device, a method, a computer program, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 8 is a diagram illustrating an example of contents of camera use schedule information illustrated in FIG. 5;

FIG. 9A is a diagram illustrating an example of contents of authentication image information;

FIG. 9B is a diagram illustrating an example of contents of display history information;

FIG. 11 is a diagram illustrating an example of contents of imaging history information;

FIG. 12 is a schematic view illustrating an example of comparing a taken image with an authentication image in authentication determination process;

FIG. 18A is a diagram illustrating an example of authentication image information according to a modification;

FIG. 18B is a diagram illustrating an example of display history information according to a modification; and FIG. 19 is a diagram illustrating an example of imaging history information according to a modification.

DETAILED DESCRIPTION

Firstly, descriptions are given to issues that have reviewed by the present inventors to find the inventions of each aspect according to the present disclosure.

(Underlying Knowledge Forming Basis of the Present Disclosure)

In order not to cause problems, such as a sneak shot, when providing such service as described in Japanese Unexamined Patent Application Publication No. 11-215421, it is desired to limit not to carry out an imaging instruction to a camera in a situation where an operating terminal is not within an imaging region of the camera. On the contrary, when an operating terminal is within an imaging allowed region of the camera, it is desired to carry out an imaging instruction with the camera.

However, a communication allowed region between the operating terminal and the camera does not generally agree with the imaging allowed region of the camera, so that there is a problem of possibly causing a case that it is not possible to carry out an imaging instruction to the camera because the operating terminal is out of the communication allowed region although being within the imaging allowed region of the camera or a case that it turns out to be possible to carry out an imaging instruction to the camera because the remote controller is within the communication allowed region although the user is not within the imaging allowed region of the camera.

The present disclosure has made in view of the above problems and provides a remote imaging method and a remote imaging control device that enable imaging with a camera only when an operating terminal is within an imaging allowed region of the camera.

1. Embodiment

Descriptions are given below to a remote imaging system 1 according to an embodiment of the present disclosure with reference to the drawings.

<1-1. Overview>

A remote imaging system 1 according to an embodiment of the present disclosure is a system to provide a service to let a user use a camera (such as an imaging device 10) that is placed at an imaging spot in a tourist attraction, a theme park, and the like to take a picture satisfied by the user.

Figure 1:
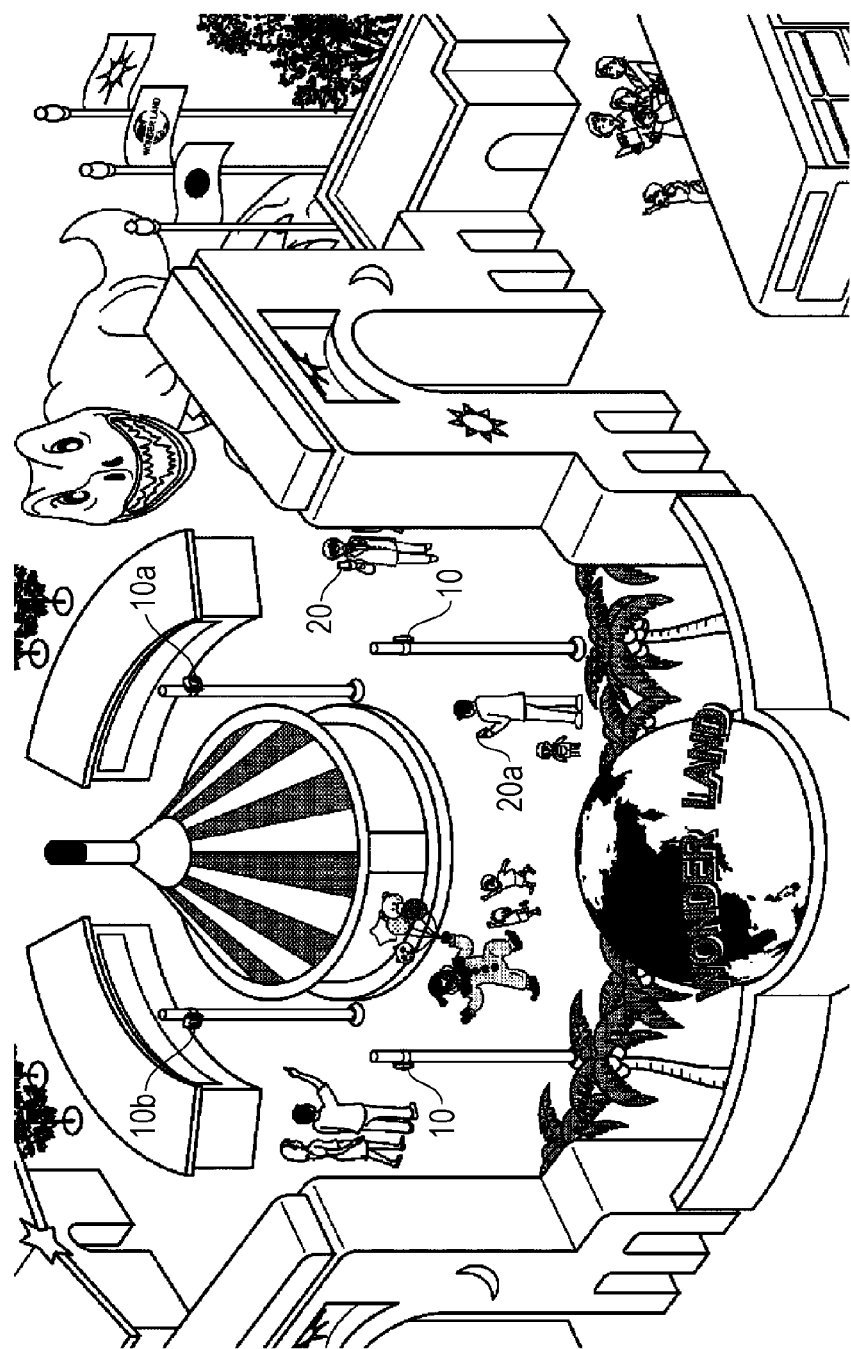
FIG. 1 is a schematic view illustrating an overview of a remote imaging system according to an embodiment of the present disclosure.

FIG. 1 is a schematic view illustrating an overview of a remote imaging system according to an embodiment of the present disclosure.

As illustrated in FIG. 1, imaging devices 10, 10*a*, 10*b*, . . . are placed at respective imaging spots. The imaging devices 10, 10*a*, 10*b*, . . . are placed respectively in positions where it is possible to image including corresponding imaging spots in the imaging regions. Respective users carry operating terminals 20, 20*a*, . . . , which are smartphones as an example. In the operating terminal 20, an authentication application is installed in advance.

When arriving at an imaging spot, a user activates the authentication application by operating the operating terminal 20. When the authentication application is activated, a plurality of types (plurality of colors) of authentication images are displayed for each predetermined period of time in a predetermined order on a display (display unit 21) of the operating terminal 20.

Figure 2A:
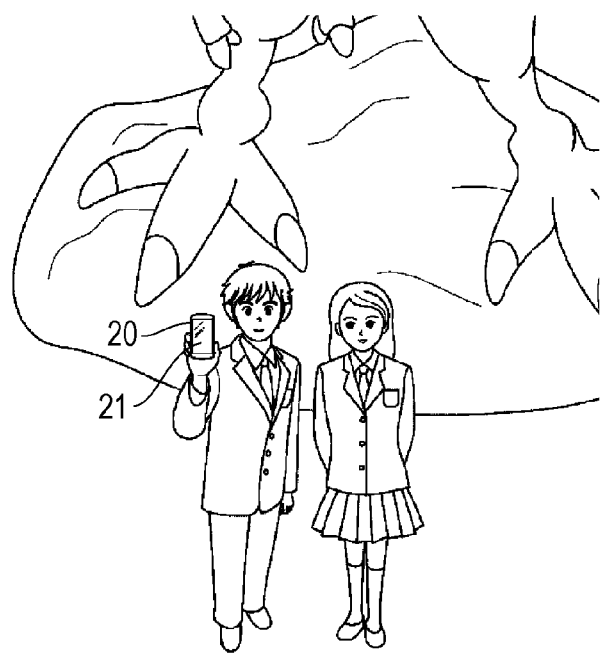
FIG. 2A is a diagram to illustrate an action of a user when carrying out authentication using an operating terminal in a remote imaging system of the present disclosure.

FIG. 2A is a diagram to illustrate an action of a user when carrying out authentication using an operating terminal in a remote imaging system of the present disclosure. Specifically, FIG. 2A is a diagram illustrating an example of an appearance of a user holding the display unit 21 of the operating terminal 20 over the imaging device 10. More specifically, FIG. 2A is a diagram of an appearance of the user holding the display unit 21 of the operating terminal 20 over the imaging device 10 taken from the imaging device 10 side.

Figure 2B:
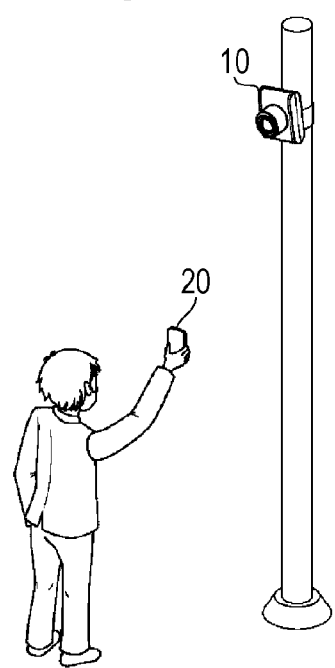
FIG. 2B is a diagram to illustrate an action of a user when carrying out authentication using an operating terminal in a remote imaging system of the present disclosure.

FIG. 2B is a diagram to illustrate an action of a user when carrying out authentication using an operating terminal in a remote imaging system of the present disclosure. Specifically, FIG. 2B is a diagram illustrating an example of an appearance of a user holding the display unit 21 of the operating terminal 20 over the imaging device 10. More specifically, FIG. 2B is a diagram of an appearance of the user holding the display unit 21 of the operating terminal 20 over the imaging device 10 taken from a back side of the user.

The user having arrived at an imaging spot that allows imaging with the imaging device 10 holds the display unit 21 (display) of the operating terminal 20 that is carried by him/herself over the imaging device 10 as illustrated in FIGS. 2A, 2B.

The imaging device 10 continuously takes an image of the user that has the operating terminal 20 positioned at an imaging spot (more specifically, an image of the user holding the display unit 21 of the operating terminal 20 over the imaging device 10). Then, the imaging device 10 carries out image processing of each of the plurality of images obtained by the continuous imaging and detects the authentication image displayed on the display of the operating terminal 20.

The imaging device 10 carries out authentication based on whether or not temporal transition of contents (as an example, color) of the authentication images corresponding to display contents that are displayed on the display of the operating terminal 20 detected from each of the plurality of images obtained by the continuous imaging and contents of the authentication images makes a predetermined pattern. Then, when the authentication is successful, the imaging device 10 permits imaging using the imaging device 10 by an instruction of the user that has the operating terminal 20.

Figure 3:
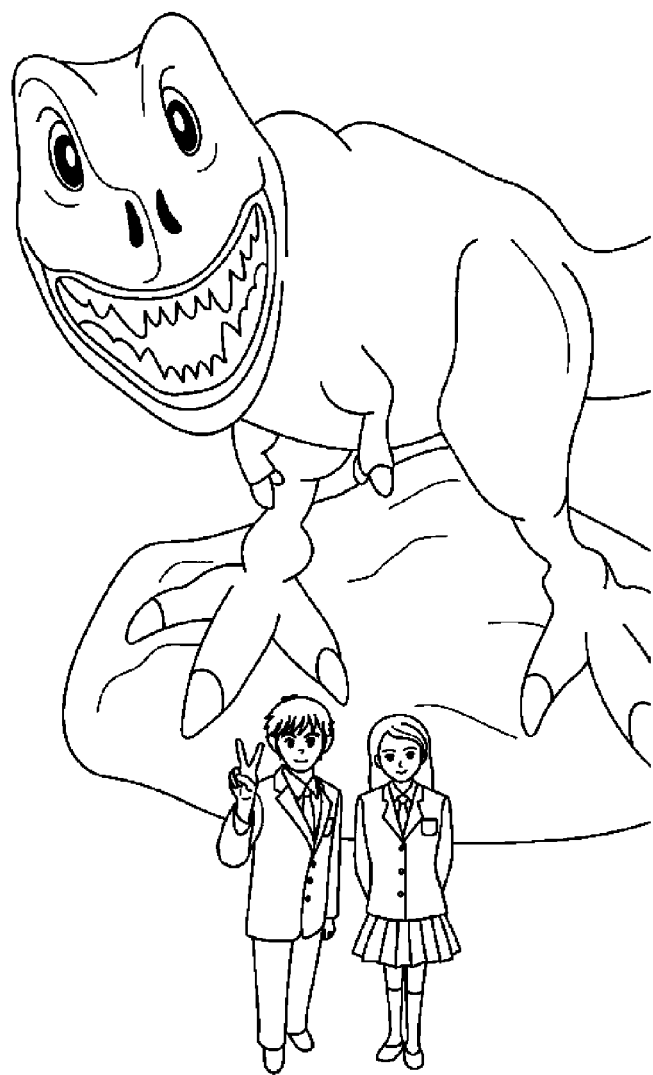
FIG. 3 is a diagram illustrating an example of a taken image that is taken by utilizing a remote imaging system of the present disclosure.

FIG. 3 is a diagram illustrating an example of a taken image that a user causes the imaging device 10 to image using the operating terminal 20. The imaging device 10 sends a taken image (as an example, FIG. 3) that is taken by the own device at timing specified by the user using the operating terminal 20 to the operating terminal 20. The operating terminal 20 stores the received taken image and presents the image to the user by displaying it on the display.

<1-2. Description on Each Device>

Figure 4:
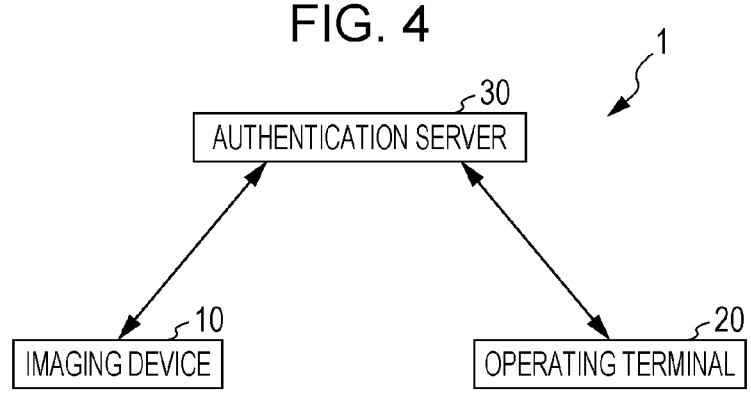
FIG. 4 is a block diagram illustrating an example of a configuration of a remote imaging system of the present disclosure.

FIG. 4 is a block diagram illustrating an example of a configuration of a remote imaging system of the present disclosure. The remote imaging system 1 includes the imaging device 10, the operating terminal 20, and an authentication server 30 as illustrated in FIG. 4. The imaging device 10 and the authentication server 30 carry out communication via a network. The operating terminal 20 carry out communication with the authentication server 30 via a mobile telecommunications network. Direct communication is not carried out between the imaging device 10 and the operating terminal 20.

<1-2-1. Authentication Server 30>

The authentication server 30 is a server device to carry out scheduling of which user to use the imaging device 10 placed at an imaging spot and the like.

<Configuration>

Figure 5:
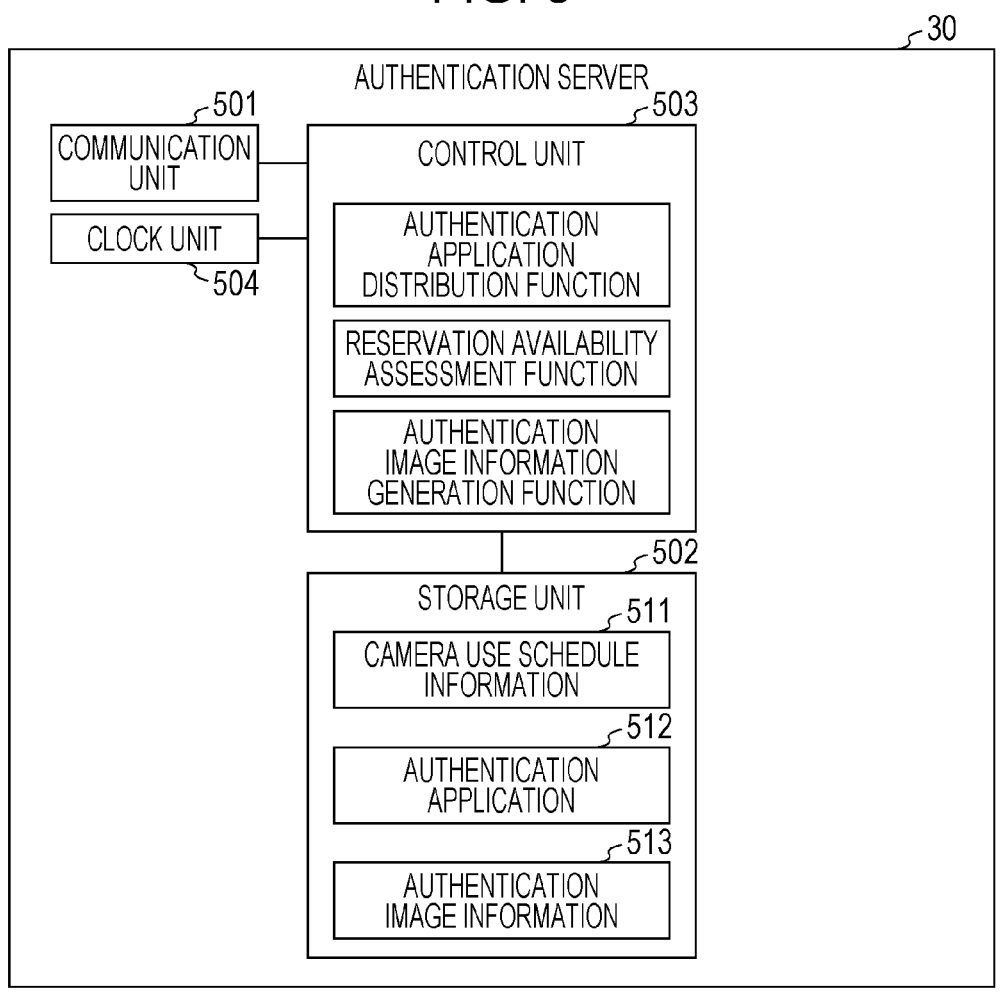
FIG. 5 is a block diagram illustrating an example of a functional configuration of an authentication server illustrated in FIG. 4.

The authentication server 30 is an information processing device and achieved by a personal computer as an example. FIG. 5 is a block diagram illustrating an example of a functional configuration of the authentication server 30. The authentication server 30 is configured to include a communication unit 501, a storage unit 502, and a control unit 503 as illustrated in FIG. 5 as the functional configuration.

The communication unit 501 is achieved by an LSI to carry out wireless communication and wired communication. The communication unit 501 has a function of carrying out wireless communication via a mobile telecommunications network and carries out sending and receiving of data with the operating terminal 20 by wireless communication. The communication unit 501 has a function of carrying out communication via a network, such as the Internet, and carries out sending and receiving of data with the imaging device 10.

The storage unit 502 is achieved by a non-volatile memory, such as a ferroelectric random access memory (FeRAM), and has a function of retaining data. The storage unit 502 retains camera use schedule information 511, an authentication application 512, authentication image information 513, and the like.

The camera use schedule information 511 is information that associates time and date when reservation is made for use of the imaging device 10 with an ID of a terminal to carry out the use (refer to camera use schedule information 511 in FIG. 8).

The authentication application 512 is a program that is executed by the operating terminal 20. By obtaining the authentication application 512 by the operating terminal 20 for execution, a reservation request function, an image display control function, an imaging operation control function, and the like are added to the operating terminal 20. The reservation request function, the image display control function, and the imaging operation control function are described later.

The control unit 503 is configured to include a processor and a memory and has a function of controlling the entire behavior of the authentication server 30. Here, the function that the control unit 503 has is achieved by that the program stored in the memory is executed by the processor. The control unit 503 has a reservation availability assessment function, an authentication image information generation function, an authentication application distribution function, and a data relay function as main functions. Each function is described below.

(a) Reservation Availability Assessment Function

The reservation availability assessment function is a function of assessing, when receiving a request (reservation request) of time and date when use of the imaging device 10 is desired from the operating terminal 20 used by the user (hereinafter, referred to as "desired time and date"), whether to allow the requesting operating terminal 20 to use the imaging device 10 (available for reservation) or not (unavailable for reservation) (refer to steps S1301 through S1303 in FIG. 13).

(b) Authentication Image Information Generation Function

Figure 13:
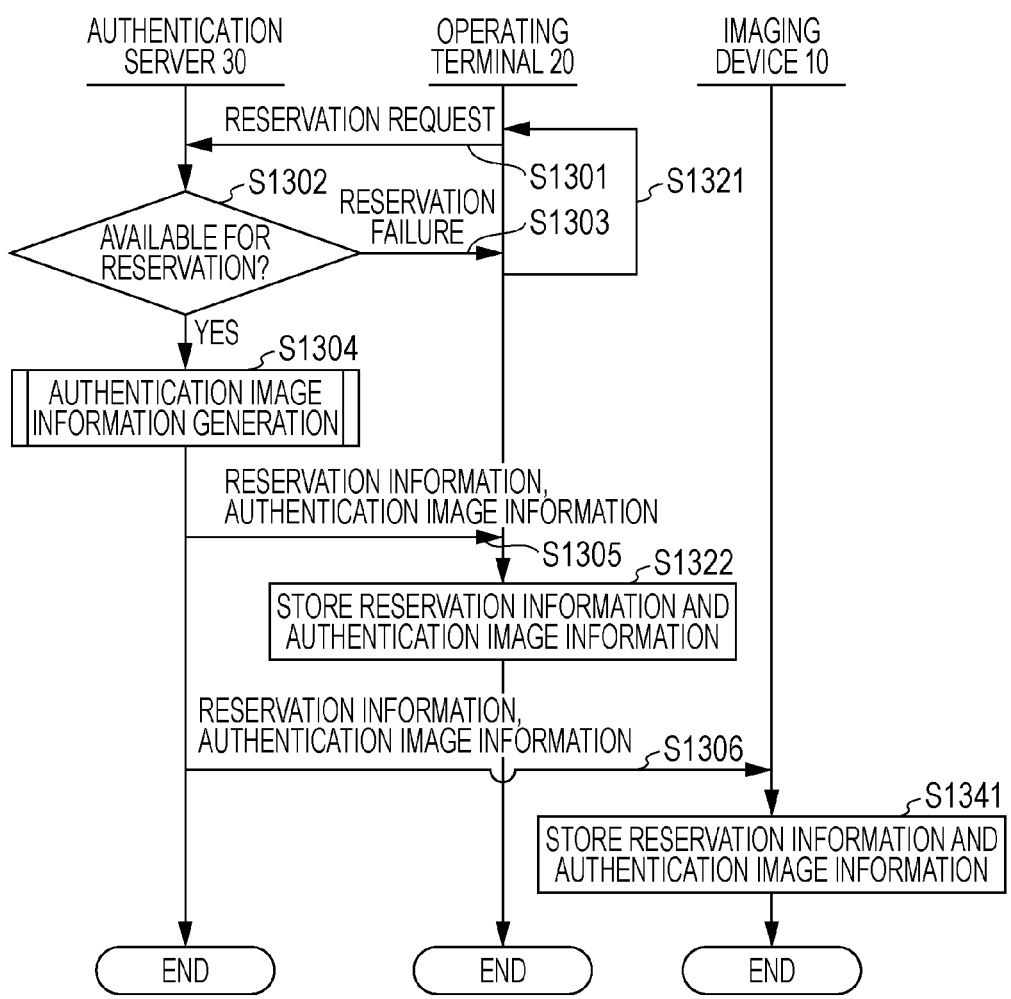
FIG. 13 is a flow chart illustrating an example of a procedure of reservation process.
Figure 14:
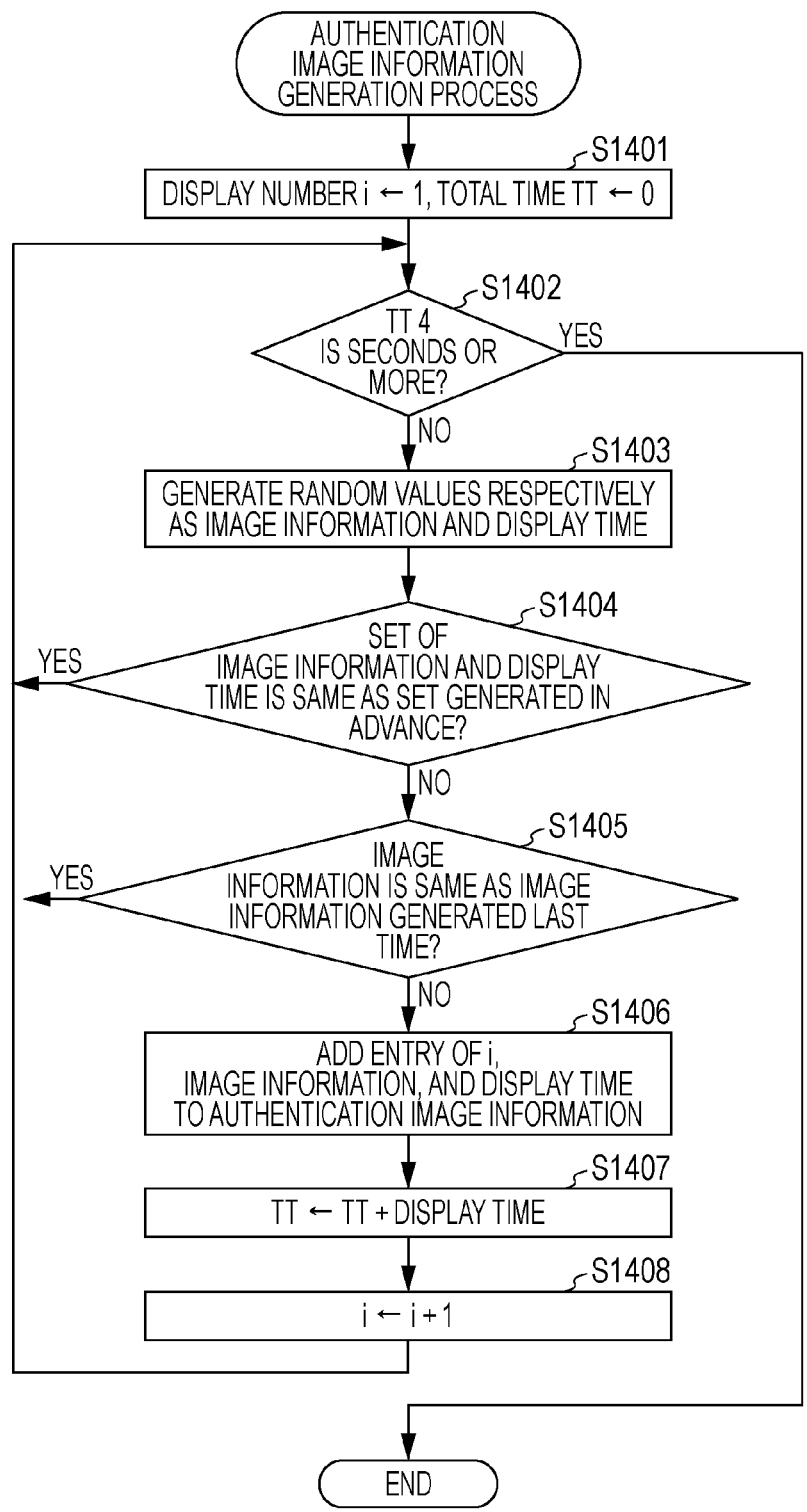
FIG. 14 is a flow chart illustrating an example of a procedure of authentication image information generation process.

The authentication image information generation function is a function of generating authentication image information (refer to step S1304 in FIG. 13 and FIG. 14). The authentication image information is control information that is used for display of a plurality of authentication images on the display provided in the operating terminal 20 continuously one by one in order (refer to authentication image information 513 in FIG. 9A).

(c) Authentication Application Distribution Function

The authentication application distribution function is a function of sending the authentication application 512 to the operating terminal that requests distribution of an authentication application.

When receiving a request for distribution of an authentication application from an operating terminal, the control unit 503 reads the authentication application 512 from the storage unit 502 and sends the read authentication application 512 to the operating terminal, which is a sender of the request for distribution.

Figure 15:
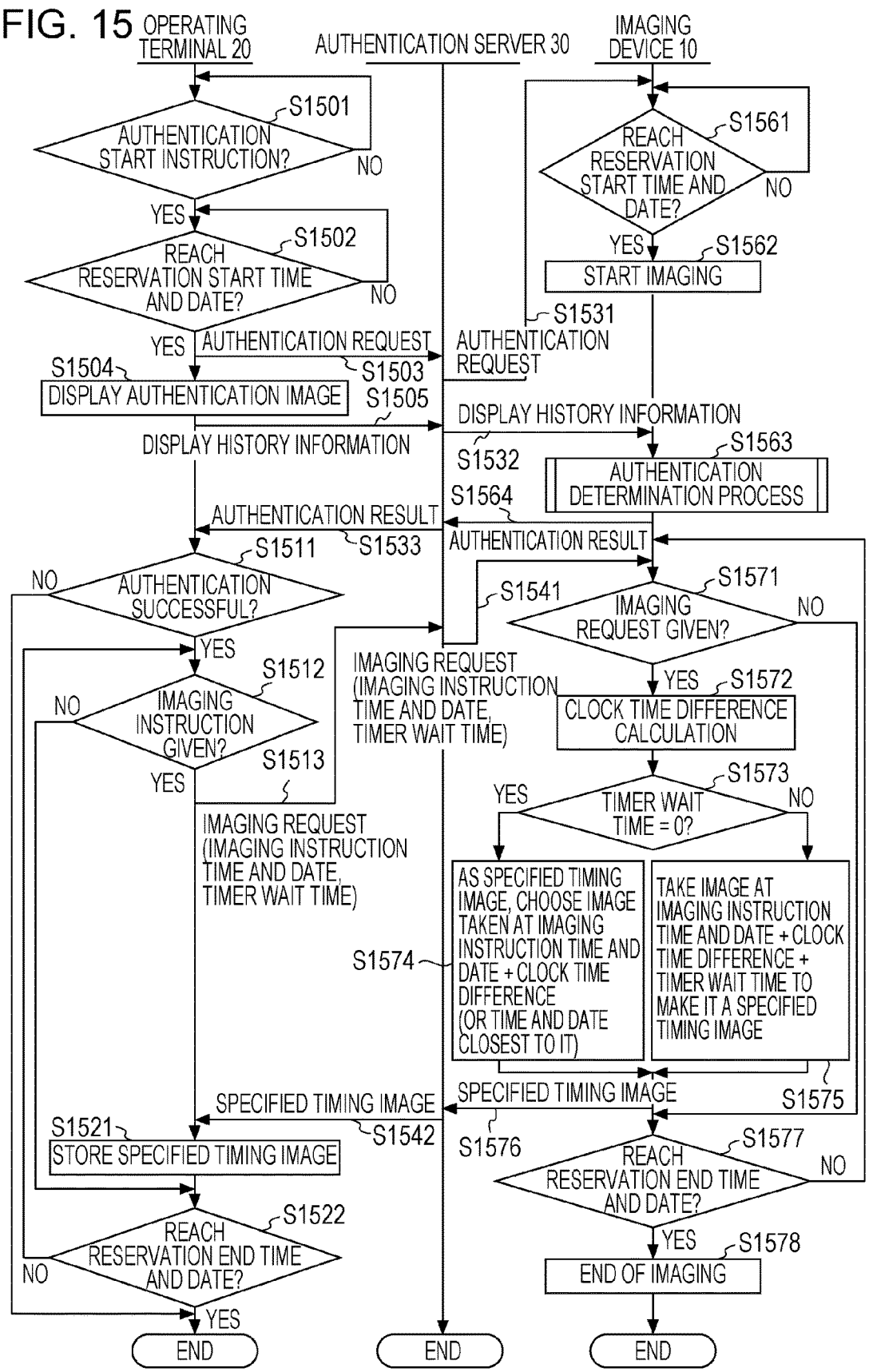
FIG. 15 is a flow chart illustrating an example of a procedure of remote imaging process.

(d) Data Relay Function (Steps S1531, S1532, S1533, S1541, S1542, and the Like in FIG. 15)

The data relay function is a function of sending the data received from the imaging device 10 to the operating terminal 20 and sending the data received from the operating terminal 20 to the imaging device 10. As the data to be relayed, the data sent by the imaging device 10 includes an authentication result, a specified timing image described later, and the like and the data sent by the operating terminal 20 includes an imaging request and the like.

A clock unit 504 is configured with a real time clock IC and has a function of measuring a clock time and a time period.

<Data Structure>

(1) Camera Use Schedule Information 511

The camera use schedule information 511 is information indicating to which operating terminal authority to use the imaging device 10 is assigned at each time and date. FIG. 8 is a diagram illustrating an example of the camera use schedule information 511.

As illustrated in FIG. 8, each row (hereinafter, referred to as "an entry") of the camera use schedule information 511 includes time and date information and an operating terminal ID. The time and date information represents beginning of a period to assign the imaging device 10 to an operating terminal identified by the operating terminal ID. Ending of the period of assignment is time and date indicated by time and date information of the next entry (more precisely, immediately before the time and date indicated by the time and date information of the next entry). In the assigned period, authentication is made for the operating terminal and imaging is carried out using the imaging device 10 by the operating terminal authenticated successfully. When no ID is described in an operating terminal ID column, it indicates that authority for use is not assigned to any operating terminal at the time and date indicated by the corresponding time and date information.

(2) Authentication Image Information 513

The authentication image information 513 is control information that is used for display of a plurality of authentication images continuously one by one in order on a display provided in the operating terminal 20. FIG. 9A is a diagram illustrating an example of contents of the authentication image information 513.

The authentication image information 513 includes a display number, image information, and display time as illustrated in FIG. 9A, for example. A row identified by the display number in the authentication image information 513 is referred to as an entry.

The example illustrated in FIG. 9A indicates that there are ten entries identified by the display numbers of 1 through 10. Each entry includes a display number corresponding to display number information, image information, and display time corresponding to display time information.

The image information and the display time included in each entry make a set. As illustrated in FIG. 9A, the authentication image information 513 is used when generating an authentication image by the image information and the display time included in each entry for display.

The display number indicates an order of displaying the associated authentication image.

For example, ten entries identified by the display numbers of 1 through 10 are used in the numerical order of the display numbers (for example, from 1 in order) to generate an authentication image for display.

The image information indicates contents of an authentication image to be displayed.

The authentication image displayed using the image information of each entry is, as an example, a color image of single color.

In this case, the image information indicates information corresponding to a color of the authentication image.

The information corresponding to color may be, for example, information such as red and blue and may also be a numerical value used when displaying an authentication image in red on the display unit 21.

The contents of the image information are determined to one randomly from, for example, a plurality of colors (or numerical values corresponding to colors) prepared in advance.

The display time indicates a length of display time to display the authentication image.

The display time is determined randomly.

In the two entries (or the sets of image information and display time) having continuous display numbers, the contents indicated by the image information included in the respective entries are different from each other.

For example, when comparing an entry identified by the display number of "1" (one entry) with an entry identified by "2" (the other entry), they are different from each other in the point that the image information of the one entry is blue and the image information of the other entry is red.

In addition, when comparing an entry identified by the display number of "2" (one entry) with an entry identified by "3" (the other entry), they are different from each other in the point that the image information of the one entry is red and the image information of the other entry is yellow.

In such a manner, when comparing an entry identified by the display number of "p" (p is an integer of not less than 1 and not more than 9) (one entry) with an entry identified by "p+1" (the other entry), it is understood that the image information of the one entry and the image information of the other entry are different from each other.

<1-2-2. Imaging Device 10>

The imaging device 10 is a device to take an image of an imaging spot. A preferred example of the imaging device 10 is a camera.

<Configuration>

Figure 6:
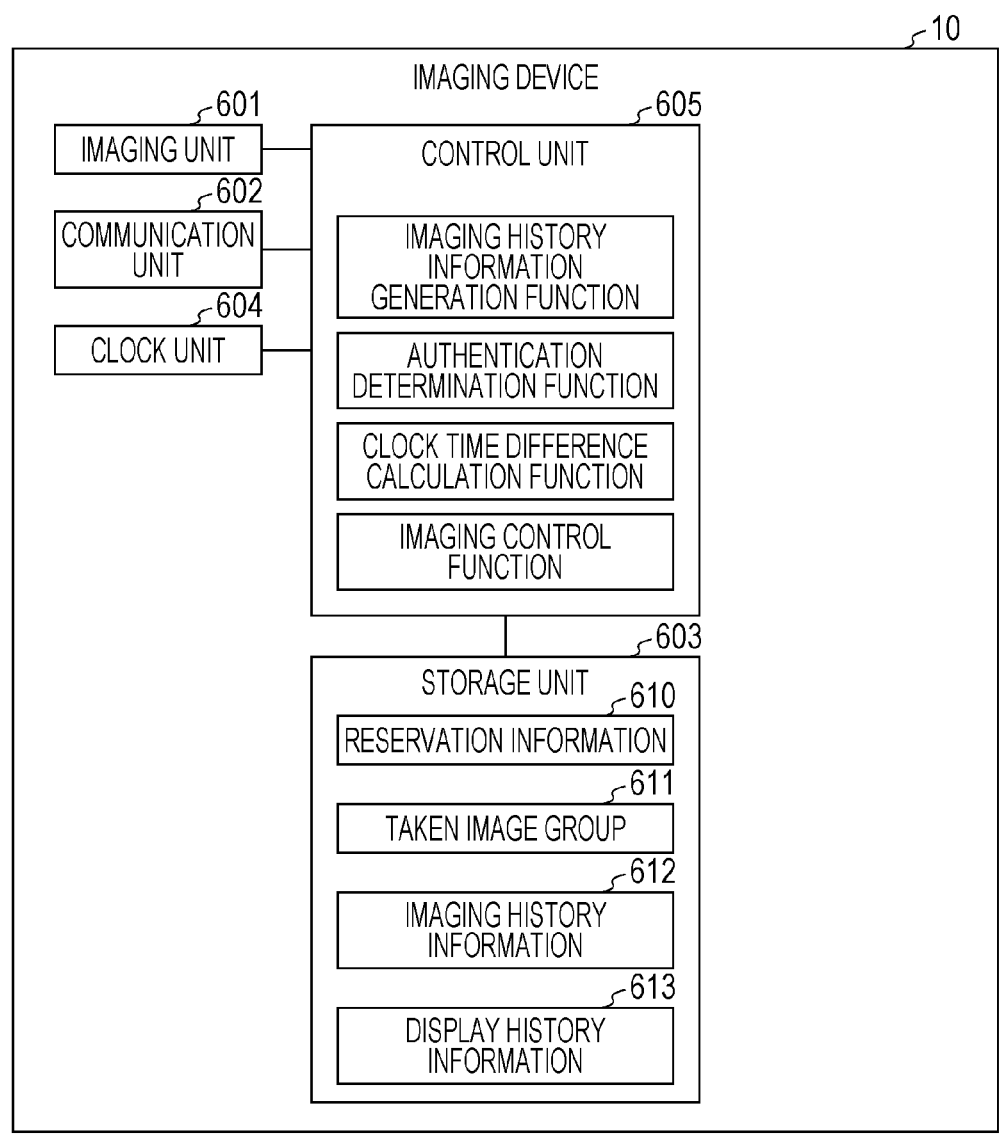
FIG. 6 is a block diagram illustrating an example of a functional configuration of an imaging device illustrated in FIG. 4.

FIG. 6 is a diagram illustrating an example of a functional configuration of an imaging device. The imaging device 10 is configured to include an imaging unit 601, a communication unit 602, a storage unit 603, a clock unit 604, and a control unit 605 as illustrated in FIG. 6 as a functional configuration.

The imaging unit 601 is achieved by a camera main body. When receiving an instruction to start imaging from the control unit 605, the imaging unit 601 starts taking an image (refer to step S1522). Taking an image is carried out for each predetermined time interval (as an example, 100 milliseconds). The imaging unit 601 also obtains time and date measured by the clock unit 604 when shooting the taken image (hereinafter, referred to as "taken time and date") from the clock unit 604. The imaging unit 601 stores an image that is taken (hereinafter, referred to as "a taken image") with the taken time and date obtained from the clock unit 604 added thereto in the storage unit 603 (refer to a taken image group 611 in FIG. 6). When receiving an instruction of end of imaging from the control unit 605, the imaging unit 601 terminates taking of the image (refer to step S1572).

The communication unit 602 includes a communication circuit to carry out, for example, wireless communication and wired communication. The communication circuit may be achieved by an LSI, for example. The communication unit 602 also carries out sending and receiving of data with the authentication server 30 via a communication channel. The communication channel may include, for example, a wired communication channel and may also include a wireless communication channel. In addition, the communication channel may also include, for example, a wired communication channel and a wireless communication channel.

The communication channel may be configured using, for example, the Internet or a local area network (LAN).

The storage unit 603 is achieved by a non-volatile memory, such as a FeRAM, and has a function of retaining data. The storage unit 603 stores display history information 613 obtained from the operating terminal 20. The storage unit 603 stores the taken image group 611 described above, imaging history information 612 generated by an imaging history information generation function of the control unit 605, and the like.

The clock unit 604 is configured with a real time clock IC and has a function of measuring a clock time and a time period.

The control unit 605 is configured to include a processor and a memory and has a function of controlling the entire behavior of the imaging devices 10. Here, each function that the control unit 605 has is achieved by that the program stored in the memory is executed by the processor. The control unit 605 has an imaging history information generation function, an authentication determination function, a clock time difference calculation function, and an imaging control function as main functions. Each function is described below.

(a) Imaging History Information Generation Function

The imaging history information generation function is a function of generating the imaging history information 612 by carrying out information processing described later to the taken image group 611 for storing it in the storage unit 603.

The imaging history information 612 is information indicating what sort of authentication images is taken by the imaging unit 601 when and for how long period. A specific description is given below to process by the imaging history information generation function that is executed by the control unit 605.

The control unit 605 carries out process to detect a display of the operating terminal 20 that appears in each taken image included in the taken image group 611 and to detect a color of the authentication image displayed on the detected display. The process to detect an area where the display appears from the taken image is carried out using a number plate detecting technique, a face detecting technique, a character detecting technique, and the like, which are known techniques. The process to detect a color of the detected area (that is, a color of the authentication image of single color that appears on the display) is enabled by using a known image processing technique.

The number plate detection described above is, as an example, to detect straight lines that are present above, below, left, and right of a frame of a number plate in the image to estimate a number plate area from their arrangements (Japanese Unexamined Patent Application Publication No. 3-265985).

The control unit 605 detects, for example, straight lines that are present above, below, left, and right of the display from the taken image and estimates (or detects) the frame of the display from their arrangements to detect the image in the estimated frame of the display as the authentication image. Here, when using a QR Code® and an image where a character is drawn as the authentication image, a display surface of the display unit 21 of the operating terminal 20 is angled and is not directed to the front relative to the direction of a lens of the imaging unit 601 of the imaging device 10, and thus a reading accuracy of the QR Code® and the character, that is, the accuracy of detecting the authentication image decreases and it is prone to fail authentication. In contrast, when using an image of single color as the authentication image, even in the case that the display surface of the display unit 21 and the direction of the lens of the imaging unit 601 are somewhat angled, the degree of the decrease in the accuracy of detecting the authentication image is suppressed low.

That is, the case of using a color image of single color as the authentication image is capable of detecting the authentication image with accuracy higher than the case of using a QR Code® and an image where a character is drawn as the authentication image.

The control unit 605 detects the frame of the display of the operating terminal 20 appeared in the taken image from each taken image as described above and further detects the authentication image that appears in the detected frame of the display to obtain a pair of the color and the taken time and date of the authentication image.

Next, for authentication images of an identical color (hereinafter, referred to as "an identical color authentication image group") detected from taken images in a continuous shooting order, the control unit 605 generates image information indicating the color, imaging time and date information that represents the period in which the identical color authentication image group is taken by the first time and date and the last time and date, and imaging time that represents the time period represented by the imaging time and date information. The imaging time and date information is expressed in a format of "start imaging time and date to end of imaging time and date" as an example. The start imaging time and date is taken time and date of one that is taken first among the authentication images included in the identical color authentication image group. The end of imaging time and date is taken time and date of one that is taken last among the authentication images included in the identical color authentication image group. The start imaging time and date and the end of imaging time and date are expressed respectively in a format of "M/D/Y H:M:S.MS" indicating "Month Date, Year Hour:Minute:Second.Millisecond×10".

The imaging time indicates a time period from the start imaging time and date to the end of imaging time and date.

The control unit 605 generates an imaging number, image information, imaging time and date information, and imaging time for the respective identical color authentication image group extracted from the taken image group 611 similar to the process described above.

Then, the control unit 605 generates the imaging history information 612 illustrated in FIG. 11 as an example having information on an identical color authentication image group as an entry to store the imaging history information 612 in the storage unit 603.

The frame of the display of the operating terminal 20 is detected from a plurality of taken images that are taken from when receiving an authentication request from the operating terminal 20 until when receiving the display history information 613 described later to make the image in the detected frame of the display to be an authentication image and indicates information on this authentication image.

FIG. 11 is a diagram illustrating an example of contents of the imaging history information 612.

In FIG. 11, a row identified by an imaging number in the imaging history information 612 is referred to as an entry of the imaging history information 612.

The imaging history information 612 includes, for example, an imaging number corresponding to imaging number information, image information, imaging time and date information, and imaging time corresponding to imaging time information.

One row of the imaging history information 612 is one entry and corresponds to one identical color authentication image group. The imaging number is a number that is given to increase the numerical value from earlier start imaging time and date (or older start imaging time and date) in the imaging time and date information in order.

The image information indicates display contents (in this case, a color) of the display detected from the plurality of taken images.

The imaging time indicates, when continuously detecting an identical display content from a plurality of continuous taken images, a length of imaging time taken for obtaining the plurality of taken images.

The imaging device 10 takes images at an interval of, for example, 100 milliseconds. The imaging device 10 carries out detection of the authentication images from, for example, older start imaging time and date in order among the plurality of taken images.

It is assumed that the imaging device 10 detects that the image in the frame of the display of the operating terminal 20, for example, is an image in red and the image in red is detected for 200 milliseconds (or from two continuous taken images).

In this case, an entry of "1" as the imaging number corresponding to the imaging number information, "red" as the image information, "03/10/2014 11:20:02.00 to 03/10/2014 11:20:02.20" as the taking time and date of the corresponding image, and 200 milliseconds as the imaging time is added to the imaging history information 612.

Next, the imaging device 10 carries out detection of authentication images from the plurality of taken images. It is assumed that the imaging device 10 detects that, for example, an image in the frame of the display of the operating terminal 20 is an image in yellow, and the image in yellow is detected for 200 milliseconds (or from two continuous taken images).

In this case, the color (or the contents) of the images to be detected is changed, so that an entry of "2" as the imaging number corresponding to the imaging number information, "yellow" as the image information, "03/10/2014 11:20:02.20 to 03/10/2014 11:20:02.40" as the taking time and date of the corresponding image, and 200 milliseconds as the imaging time is added to the imaging history information 612.

In a similar manner, a new entry having an imaging number incremented by 1 is created later at timing when the color (or contents) of the detected image is changed and corresponding image information, taken time and date, and imaging time are added thereto.

In such a manner, by adding an entry to the imaging history information 612, a set of display contents and imaging time information indicating a length of imaging time for which the display contents is taken continuously and imaging history information including imaging number information indicating the order that the display content corresponding to this set is taken are stored in the storage unit 603 of the imaging device 10 for each different display content in terms of the time transition of the display contents of the display of the operating terminal 20 detected from the plurality of taken images.

Figure 16:
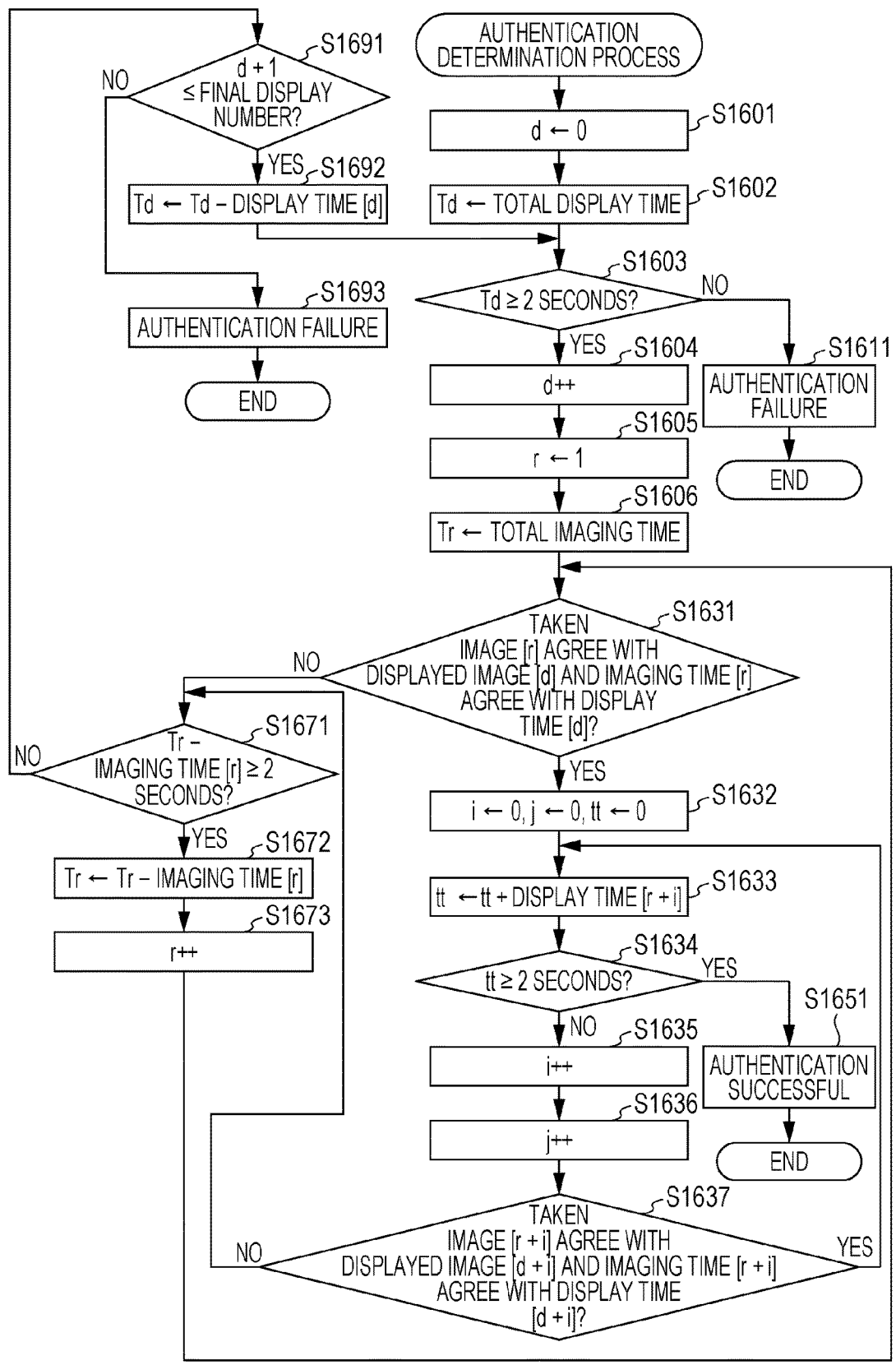
FIG. 16 is a flow chart illustrating an example of a procedure of authentication determination process.

(b) Authentication Determination Function (Refer to Step S1563 in FIG. 15 and FIG. 16)

The authentication determination function is a function of determining whether or not to allow imaging authority of an imaging spot using the imaging device 10 (imaging unit 601), which is the own device, to be given to the operating terminal 20 for authentication based on the determination result.

(c) Clock Time Difference Calculation Function (Step S1572 in FIG. 15)

The clock time difference calculation function is a function of calculating a difference between a clock time measured by the clock unit 604 of the imaging device 10 and a clock time measured by a clock unit 704 of the operating terminal 20 (hereinafter, referred to as "clock time difference"). The clock time difference is used for an imaging control function described next.

The control unit 605 calculates the clock time difference using, as an example, the display history information 613 and the imaging history information 612. Specifically, each one entry is chosen respectively from the display history information 613 and the imaging history information 612. Then, it is assessed whether or not the image information of both chosen entries agrees and also the display time agrees. When they agree, a difference between the start display time and date of the entry in the display history information 613 and the taken time and date of the entry in the imaging history information 612 is calculated. The calculated difference becomes the clock time difference described above. When they do not agree, choosing each one entry respectively from the display history information 613 and the imaging history information 612 until finding a pair of entries having agreeing image information and also agreeing display time and imaging time is repeated, and when it is found, a difference of start time and date in both entries is calculated to make it to be the clock time difference described above.

FIG. 9B is a diagram illustrating an example of contents of the display history information 613. FIG. 11 is a diagram illustrating an example of contents of the imaging history information 612.

In the present embodiment, a description is given to calculation of a clock time difference when, for example, the contents of the display history information 613 are as illustrated in FIG. 9B and the contents of the imaging history information 612 are as illustrated in FIG. 11.

When comparing entries in the display history information 613 with entries in the imaging history information 612 in order, it is understood that the image information of both an entry having a display number in the display history information 613 of 3 and an entry having an imaging number in the imaging history information 612 of 2 agrees as "yellow" and both the display time and the imaging time agree as "200 milliseconds". At this time, the start display time and date of the entry having a display number in the display history information 613 of 3 and the oldest (or earliest) taken time and date in the taken time and dates of the entry having an imaging number in the imaging history information 612 of 2 are respectively "3/10/2014 11:20:00.90" and "3/10/2014 11:20:02.20" and the clock time difference is "0:0:01.30" (1.3 seconds).

(d) Imaging Control Function (Refer to Steps S1571 Through S1578 in FIG. 15)

The imaging control function is a function of receiving an imaging request via the authentication server 30 from the operating terminal 20 and sending an image that is taken when the clock unit 604 measures the time and date indicated by the imaging instruction time and date+the clock time difference+the timer wait time included in the imaging request or an image that is taken at time and date closest to the time and date (hereinafter, these images are referred to as "a specified timing image") via the authentication server 30 to the operating terminal 20.

<1-2-3. Operating Terminal 20>

The operating terminal 20 is a device to carry out reservation request process, imaging operation control to take a picture at an imaging spot, and the like.

<Configuration>

Figure 7:
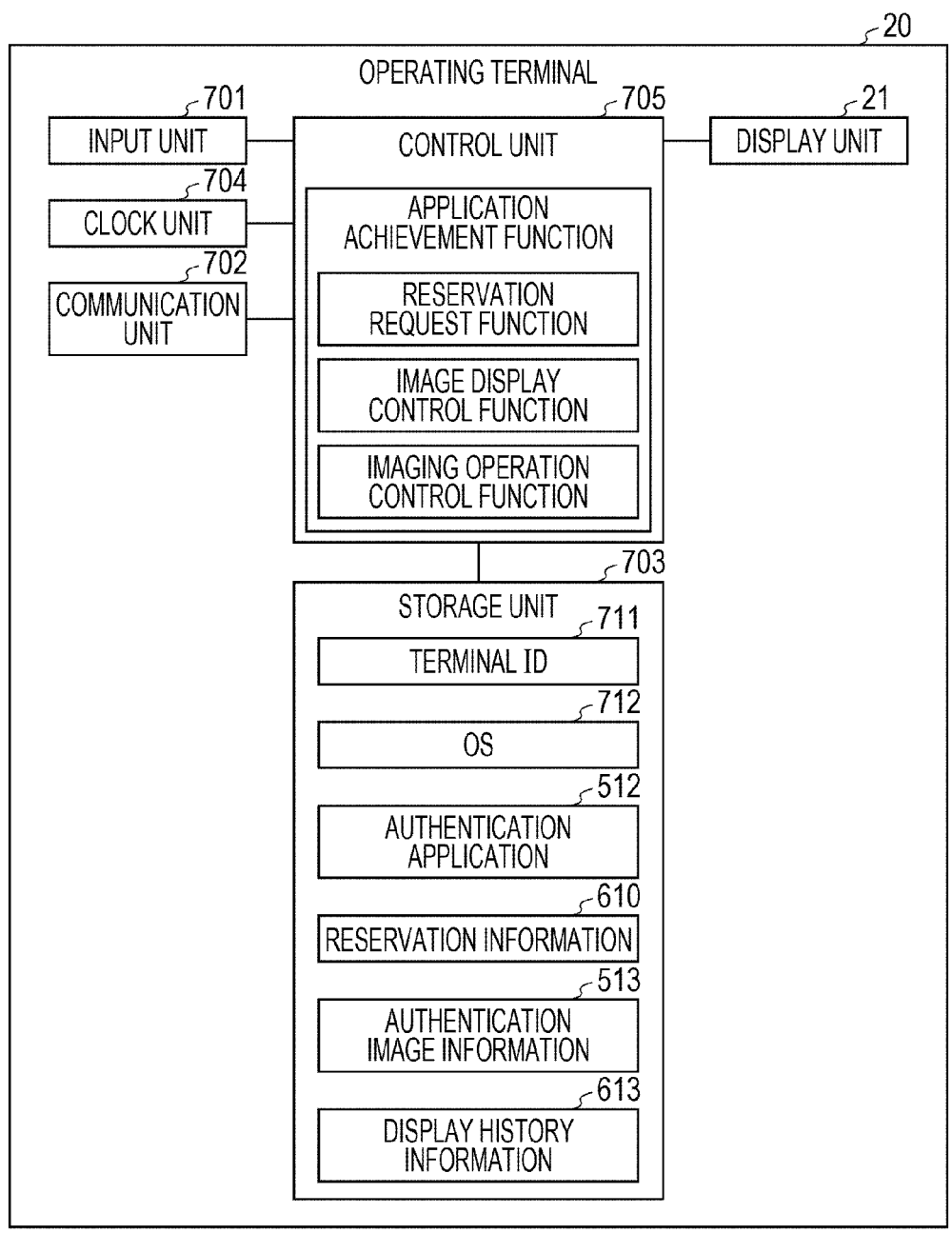
FIG. 7 is a block diagram illustrating an example of a functional configuration of an operating terminal illustrated in FIG. 4.

The operating terminal 20 is a portable information processing terminal and is achieved by, as an example, a so-called smartphone. FIG. 7 is a block diagram illustrating an example of a functional configuration of the operating terminal 20. The operating terminal 20 is configured to include the display unit 21, an input unit 701, a communication unit 702, a storage unit 703, a clock unit 704, and a control unit 705 as illustrated in FIG. 7 as functional configuration.

The display unit 21 is achieved by a display and a display control circuit. The display is, as an example, a liquid crystal display. The display control circuit may be configured using, for example, an LSI. The display control circuit has a function of obtaining image information indicating what sort of image to be displayed and displaying the image indicated by the image information on the display.

The input unit 701 is achieved by a touch pad and has a function of sensing a touching operation by the user from a change in capacitance and notifying the control unit 705 of a user instruction indicated by the touching operation. The input unit 701 is used to input a user instruction, such as a cursor displayed on a liquid crystal display to be moved by the user or a displayed object such as an icon to be selected.

The communication unit 702 is achieved by an LSI to carry out wireless communication using a mobile telephone network, a data communications network, the Internet, and the like. The communication unit 702 carries out sending and receiving of data with the authentication server 30 by wireless communication.

The storage unit 703 is achieved by a non-volatile memory, such as a FeRAM, and has a function of retaining data. The storage unit 703 retains a terminal ID 711, an operating system (OS) 712, the authentication application 512, reservation information 610, the authentication image information 513, and the display history information 613. The authentication image information 513 is generated by the authentication server 30 and obtained from the authentication server 30 for storage.

The terminal ID 711 is an ID to identify each operating terminal and is assigned to each operating terminal in advance.

The OS 712 is an operating system to carry out the entire control of the operating terminal 20 and is executed by the control unit 705.

The authentication application 512 is a program to be installed in the OS 712.

The operating terminal 20 sends a request for distribution of the authentication application 512 to the authentication server 30 at least before carrying out a reservation request to the authentication server 30 and downloads the authentication application from the authentication server 30 as a response to it for storage in the storage unit 703.

When a specified timing image is obtained from the imaging device 10 via the authentication server 30, the storage unit 703 also retains the specified timing image.

The clock unit 704 is configured with a real time clock IC and has a function of measuring a clock time and a time period.

The control unit 705 is configured to include a processor and a memory and has a function of controlling the entire behavior of the operating terminals 20. Each function that the control unit 705 has is achieved by executing the program stored in the memory by the processor. The control unit 705 executes a function in accordance with the user instruction obtained from the input unit 701. The control unit 705 has a reservation request function, an image display control function, and an imaging operation control function as main functions. The reservation request function is achieved by executing a reservation request module 1011 included in the authentication application 512 by the control unit 705. The image display control function is achieved by executing an image display control module 1012 by the control unit 705. The imaging operation control function is achieved by executing an imaging operation control module 1013 by the control unit 705.

(a) Reservation Request Function

The reservation request function is a function of securing a right in advance for using the imaging device 10 placed at an imaging spot at time and date that is desired by a user (equivalent to steps S1301 and S1321 in FIG. 13).

(b) Image Display Control Function (Step S1504 in FIG. 15)

The image display control function is a function of controlling a predetermined authentication image to be displayed on the display unit 21 at predetermined time and date. The control unit 705 reads an entry in the order of smaller display number one by one from the authentication image information 513 as specific process. Then, the control unit 705 gives an instruction to the display unit 21 to display the authentication image indicated by the image information included in the read entry for the display time included in the entry every time reading an entry.

As an example, a description is given of carrying out an instruction to the display unit 21 to extract a corresponding entry from one having a smaller display number included in the authentication image information 513 to display an authentication image indicated by the corresponding image information for the display time.

Firstly, when the contents of the authentication image information 513 is what is illustrated in FIG. 9A, the control unit 705 firstly refers to an entry having a display number of 1 and gives an instruction to the display unit 21 to display an image in blue corresponding to the image information included in the entry as the authentication image for the display time (300 milliseconds) included in the entry.

Next, the control unit 705 refers to an entry having a display number of 2 and gives an instruction to the display unit 21 to display an image in red corresponding to the image information included in the entry as the authentication image for the display time (600 milliseconds) included in the entry.

Later to the final display number (as an example, 10), the control unit 705 refers to an entry identified by each display number and gives an instruction to the display unit 21 to display an image indicated by the image information included in the entry as the authentication image for the display time included in the entry.

By the above control, on the display unit 21, an image in blue is displayed for 300 milliseconds (display number 1), and then an image in red for 600 milliseconds (display number 2), an image in yellow for 200 milliseconds (display number 3), an image in green for 700 milliseconds (display number 4), an image in purple for 400 milliseconds (display number 5), an image in light blue for 500 milliseconds (display number 6), an image in blue for 200 milliseconds (display number 7), an image in green for 300 milliseconds (display number 8), an image in red for 600 milliseconds (display number 9), and an image in yellow for 200 milliseconds (display number 10).

The control unit 705 obtains time and date measured by the clock unit 704 from the clock unit 704 when starting display and terminating display for each plurality of authentication images, for example. The control unit 705 makes the time and dates obtained from the clock unit 704 when starting and ending display of the authentication image to be start display time and date and end of display time and date of the authentication image.

In other words, every time an authentication image corresponding to an entry is displayed, the control unit 705 records information indicating from when and until when the authentication image is displayed (information indicating from the start display time and date to the end of display time and date) as the display history information 613 (refer to FIG. 9B).

(c) Imaging Operation Control Function

The imaging operation control function includes a function of, when receiving a specification of timing for imaging by the user in the case of obtaining an authentication result indicating successful authentication from the authentication server 30, obtaining the specified timing image taken by the imaging device 10 at the received timing for imaging from the imaging device 10. The imaging operation control function also includes a function of displaying the specified timing image obtained from the imaging device 10 on the display of the display unit 21. The imaging operation control function also includes a function of storing the obtained specified timing image in the storage unit 703 (equivalent to steps S1511 through S1522 in FIG. 15). The timing for imaging includes two types of (i) when a user inputs an imaging instruction by touching a shutter button icon displayed on the display unit 21 and (ii) when predetermined timer wait time (for example, 10 seconds) has passed after a user touches a shutter button icon.

The option (ii) corresponds to a self-timer function. In the case of (ii), the operating terminal 20 carries out notification of imaging, such as an audio output like "Smile!", for example, that tells a user that imaging is just being made immediately before the predetermined setting time passes after the user touches the shutter button icon. The notification of imaging may also be an output of a sound effect, such as a beep, a display of countdown of the setting time, and the like. The predetermined timer wait time described above is inputted to the operating terminal 20 using the input unit 701 in advance by the user.

The user inputs whether or not to use the self-timer function to the operating terminal 20 using the input unit 701 before inputting the timing for imaging.

When an imaging instruction is inputted by the user, the control unit 705 sends an imaging request to the imaging device 10 via the authentication server 30. The imaging request includes imaging instruction time and date and the timer wait time described above. The imaging instruction time and date is the time and date measured by the clock unit 704 when the user inputs the imaging instruction.

When the user inputs as not using the self-timer function, the value of the timer wait time included in the imaging request is set as 0.

<Data Structure>

(1) Authentication Application 512

Figure 10:
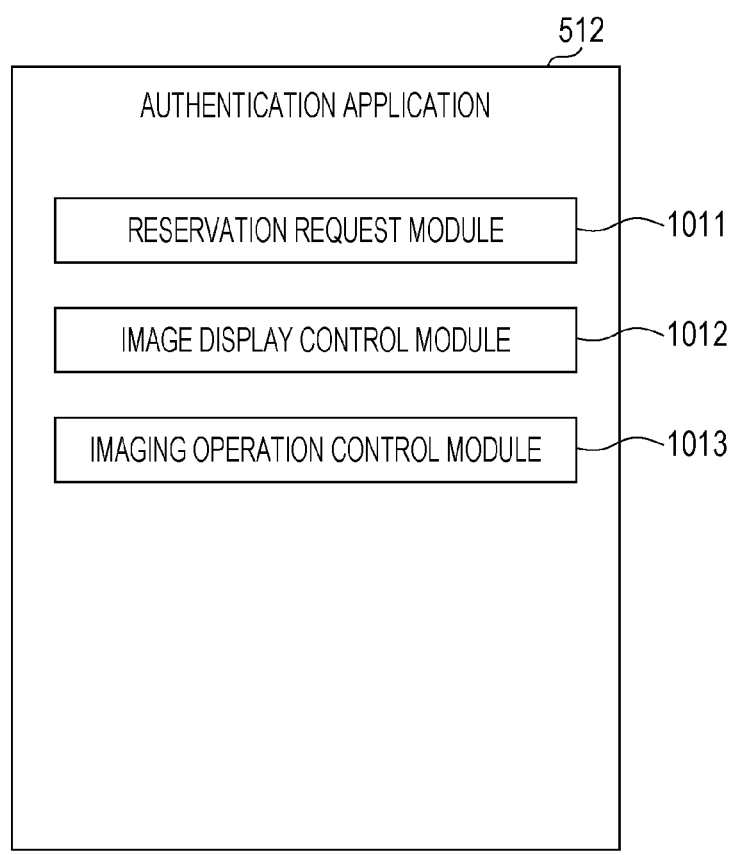
FIG. 10 is a schematic view illustrating an example of a data configuration of an authentication application.

The authentication application 512 is a program to be installed in the OS 712. A description is given below to the authentication application 512 using FIG. 10. FIG. 10 is a diagram illustrating an example of a data configuration of the authentication application 512.

The authentication application 512 includes the reservation request module 1011, the image display control module 1012, and the imaging operation control module 1013 as illustrated in FIG. 10. By executing the reservation request module 1011 by the control unit 705, the reservation request function described above is achieved. By executing the image display control module 1012 by the control unit 705, the image display control function described above is achieved. By executing the imaging operation control module 1013 by the control unit 705, the imaging operation control function is achieved.

(2) Display History Information 613

The display history information 613 is a record of what sort of authentication images displayed when and for how long period every time the operating terminal 20 displays an authentication image on the display unit 21 as described above as a history. FIG. 9B is a diagram illustrating an example of the display history information 613.

The display history information 613 includes a display number, image information, display time and date information, and display time as illustrated in FIG. 9B. Each row identified by the display number (hereinafter, referred to as "an entry") corresponds to an authentication image.

The display number indicates the order of displaying the authentication image indicated by the image information in the entry.

The image information indicates the contents of the displayed authentication image. As an example, the image information indicates the color of the authentication image.

The display time and date information indicates time and date when display of the authentication image is started (hereinafter, referred to as "start display time and date") and time and date when display of the authentication image is ended (hereinafter, referred to as "end of display time and date"). Here, the display time and date information is described in a format of "start display time and date to end of display time and date". The start display time and date and the end of display time and date are described respectively in a format of "M/D/Y H:M:S.MS" indicating "Month Date, Year Hour:Minute:Second.Millisecond×10".

The display time indicates a time period from the start display time and date until the end of display time and date.

<1-3. Behavior>

Descriptions are given below to the reservation process and the remote imaging process that are executed by the remote imaging system configured as above.

<1-3-1. Reservation Process>

The reservation process is process for reservation to allow the user to use of the imaging device 10 at desired time and date. A description is given below to the reservation process using FIG. 13.

FIG. 13 is a flow chart illustrating an example of a procedure of the reservation process. Firstly, a user gives an instruction of execution of the authentication application 512 (in particular, reservation request module 1011) using the input unit 701 of the own operating terminal 20. The control unit 705 executes the authentication application 512.

Thus, the reservation request process of the control unit 705 is started. The user gives an instruction of display of a desired time and date input screen to accept an input of desired time and date information indicating the desired time and date when use of the imaging device 10 is desired using the input unit 701. Following the instruction, the control unit 705 causes the display unit 21 to display the desired time and date input screen. The user inputs the desired time and date information using the input unit 701. The input unit 701 sends the desired time and date information to the control unit 705. When the desired time and date information is inputted, the control unit 705 reads the terminal ID 711 from the storage unit 703 and sends a reservation request including the terminal ID 711 and the desired time and date information to the authentication server 30 (step S1301). The authentication server 30 receives the reservation request.

In step S1302, the control unit 503 of the authentication server 30 refers to the camera use schedule information 511 stored in the storage unit 502. The control unit 503 determines whether or not the operating terminal ID is stored in association with the time and date information of the camera use schedule information 511 that agrees with the desired time and date information included in the reservation request. The reservation is available when the determination result in step S1302 is positive, and the reservation is unavailable when it is negative. In the case of available for reservation, the time and date indicated by the time and date information is made as the reservation start time and date and the time and date information indicated by the time and date information in the next row (next entry) in the camera use schedule information 511 is made as the reservation end time and date.

FIG. 8 is a diagram illustrating an example of contents of the camera use schedule information 511. For example, when the contents of the camera use schedule information 511 is illustrated in FIG. 8, an entry to which an operating terminal ID is not assigned has the time and date information of "3/10/2014 11:20". Therefore, when the desired time and date information indicates "3/10/2014 11:20", reservation is available. In this case, the reservation start time and date is "3/10/2014 11:20" and the reservation end time and date is "3/10/2014 11:30".

The process goes on to step S1304 when determined as available for reservation in step S1302, and the control unit 503 notifies the operating terminal 20 of reservation failure when unavailable for reservation (step S1303).

In step S1321, when receiving the notification of reservation failure in step S1303, the operating terminal 20 carries out display indicating reservation failure on the display unit 21. The user watching the display inputs the desired time and date information indicating desired time and date different from that of the reservation failure using the input unit 701. The process after the desired time and date information is inputted is as described in steps S1301 through S1303 above.

In step S1304, the authentication server 30 generates the authentication image information 513 (refer to FIG. 14). The authentication server 30 generates the authentication image information 513 having different contents for each operating terminal or every time reservation succeeds. Thus, it is possible to prevent improper process, such as the authentication image information 513 generated and used for another operating terminal or other reservation being analyzed and diverted to the operating terminal 20 to be successfully authenticated.

The authentication server 30 generates the reservation information 610. The reservation information 610 is information including the reservation start time and date and the reservation end time and date in the entry determined as available for reservation described above.

Next, the authentication server 30 sends the reservation information 610 and the authentication image information 513 to the operating terminal 20 (step S1305).

In step S1322, the control unit 705 of the operating terminal 20 receives the reservation information 610 and the authentication image information 513 using the communication unit 702 for storage in the storage unit 703.

Next, the authentication server 30 sends the reservation information 610 and the authentication image information 513 to the imaging device 10 (step S1306). In the imaging device 10, the control unit 605 receives the reservation information 610 and the authentication image information 513 using the communication unit 501 for storage in the storage unit 603 (step S1341).

<1-3-2. Authentication Image Information Generation Process>

A detailed description is given below to the authentication image information generation process by the authentication server 30 illustrated in step S1304 in FIG. 13 using FIG. 14. FIG. 14 is a flow chart illustrating an example of a procedure of the authentication image information generation process.

In step S1401, the control unit 503 of the authentication server 30 initializes each variable used for the following process. Specifically, 1 is substituted to a value of a display number i and 0 is substituted to a value of total time TT, and the process goes on to step S1402.

In step S1402, the control unit 503 determines whether or not TT is not less than a predetermined generation time length (as an example, four seconds). The process is terminated when the determination is positive in step S1402 (Yes in step S1402), and the process goes on to step S1403 when the determination is negative (No in step S1402).

In step S1403, respective random values are generated as the contents of the image information and the length of the display time to be described as an entry of the authentication image information 513 (step S1403). Here, to describe an example of a color image of single color as the authentication image, the image information represents a color (or value corresponding to the color) to be displayed in one authentication image. In step S1403, for example, as the image information to be described as one entry, one color is randomly selected (or a value corresponding to the color is randomly generated) from a plurality of colors prepared in advance. In step S1403, for example, as the display time to be described as one entry, a value indicating time within a range from 100 ms to 900 ms inclusive is randomly generated.

In step S1404, whether or not a set of the image information and the display time generated in step S1403 is same as a set of image information and display time generated in advance is determined. This is because, when the set of the image information and the display time generated in step S1403 is same as a set of image information and display time generated in advance, the authentication may fail caused by not being able to distinguish both sets.

The process goes on to step S1402 when the determination is positive in step S1404 (Yes in step S1404), and the process goes on to step S1405 when the determination is negative (No in step S1404).

In step S1405, the control unit 503 determines whether or not the image information generated in step S1403 is same as the image information generated last time. This is because, when the image information of the two continuous entries is same, the color of the authentication image displayed in accordance with the image information of the entry turns out not to transit, so as to avoid such situation. The process goes on to step S1402 when the determination is positive in step S1405 (Yes in step S1405), and the process goes on to step S1406 when the determination is negative (No in step S1405).

In step S1406, the control unit 503 adds an entry including i corresponding to the display number, image information, and display time to the authentication image information.

For example, in the procedure of generating the authentication image information illustrated in FIG. 9A, a case is considered where, for example, i corresponding to the display number is 3, the image information generated in step S1406 is "yellow", and the display time is "200 ms".

In this case, the contents are not same as the entries identified by a display number of 1 and 2 (or set of image information and display time) generated in advance and the image information is different from that of the entry identified by a display number of 2 generated in advance (in this example, red). Therefore, in the above case, the determination is negative respectively in steps S1404 and S1405, so that "3, yellow, 200 milliseconds" is recorded as an entry in the authentication image information.

Next, the control unit 503 adds the display time to TT (step S1407) and increments i by 1 (step S1408), and the process goes on to step S1402.

Thus, the process of adding an entry corresponding to step S1407 turns out to be terminated when a total value of the display time indicated in each entry of the authentication image information becomes not less than a value used for the determination in step S1402 (in this example, four seconds).

<1-3-3. Remote Imaging Process>

The remote imaging process is process where a user controls the imaging device 10 using the operating terminal 20 to carry out imaging by the imaging unit 601 provided in the imaging device 10. A detailed description is given below to the remote imaging process using FIG. 15.

FIG. 15 is a flow chart illustrating an example of a procedure of the remote imaging process. The operating terminal 20 waits until an authentication start instruction is inputted by the user using the input unit 701 (step S1501). When an authentication start instruction is inputted (Yes in step S1501), the control unit 705 of the operating terminal 20 determines whether or not the current clock time measured by the clock unit 704 reaches the reservation start time and date included in the reservation information (step S1502). When the current clock time does not reach the reservation start time and date (No in step S1502), the process goes on to step S1503 after waiting until the current clock time reaches the reservation start time and date. When the current clock time reaches the reservation start time and date (Yes in step S1502), the process goes on to step S1503.

In step S1503, the control unit 705 sends an authentication request to the authentication server 30 using the communication unit 702. In step S1531, the authentication server 30 receives the authentication request and sends the received authentication request to the imaging device 10 by the data relay function. The imaging device 10 receives the authentication request.

When the authentication request is received, the control unit 605 of the imaging device 10 waits until a current clock time measured by the clock unit 604 reaches the reservation start time and date included in the reservation information (step S1561). When the current clock time reaches the reservation start time and date (Yes in step S1561), the control unit 605 gives an instruction of start imaging to the imaging unit 601. When start imaging is instructed, the imaging unit 601 starts continuously taking images (step S1562). An image is taken for each predetermined time interval (as an example, 100 milliseconds) and the taken image is stored with taken time and date added thereto. The plurality of taken images that are stored configure the taken image group 611.

In step S1504, the operating terminal 20 displays an authentication image based on the authentication image information 513. Specifically, the image display control function described above is executed, thereby the control unit 705 reads entries one by one from those having a smaller display number in order (in this example, from 1 in order) indicated by the authentication image information 513 and gives an instruction to the display unit 21 to display the authentication image indicated by the image information included in the read entry for the display time included in the read entry.

Thus, an authentication image corresponding to the entry read out on the display unit 21 is displayed during the display time included in the entry. The control unit 705 generates the display history information 613 in addition to display of the authentication image.

When display of the authentication image is completed, the control unit 705 of the operating terminal 20 sends the display history information 613 to the authentication server 30 using the communication unit 702 (step S1505).

In step S1532, the authentication server 30 receives the display history information 613 from the operating terminal 20 and sends the received display history information 613 to the imaging device 10 by the data relay function.

When receiving the display history information 613, the control unit 605 of the imaging device 10 carries out the authentication determination process by executing an authentication function (step S1563). Details of the authentication process in step S1563 is described later using FIG. 16. By the authentication process, an authentication result of authentication successful or authentication failure is obtained.

When the authentication determination process in step S1563 is completed, the control unit 605 of the imaging device 10 sends the authentication result to the authentication server 30 using the communication unit 602 (step S1564).

The authentication server 30 receives the authentication result sent by the imaging device 10 using the data relay function and sends it to the operating terminal 20 (step S1533). The control unit 705 of the operating terminal 20 receives the authentication result.

In step S1511, the control unit 705 of the operating terminal 20 determines whether or not the received authentication result is authentication successful. When the determination is positive (Yes in step S1511), the control unit 705 waits until an imaging instruction is inputted by the user (step S1512). The imaging instruction is made by the user touching a shutter button icon displayed on the display unit 21. When using the self-timer function as described above, the user carries out an input of the self-timer function in advance before the imaging instruction is inputted.

When the imaging instruction is made (Yes in step S1512), the control unit 705 sends an imaging request to the authentication server 30 (step S1513). Here, the imaging request includes imaging instruction time and date and timer wait time. The authentication server 30 receives the imaging request and sends the received imaging request to the imaging device 10 by the data relay function (step S1541).

When receiving the imaging request (Yes in step S1571), the control unit 605 calculates a clock time difference by the clock time difference calculation function (step S1572). Then, whether or not the timer wait time included in the received imaging request is 0 is determined (step S1573). When the timer wait time is 0 (Yes in step S1573), the control unit 605 chooses an image taken at imaging instruction time and date+clock time difference as the specified timing image from the taken image group 611 (step S1574). When no taken images has the taken time and date agreeing with the imaging instruction time and date+clock time difference in the taken image group 611, a taken image having the taken time and date closest to the imaging instruction time and date+clock time difference is chosen as the specified timing image.

In contrast, when the timer wait time is determined not to be 0 in S1573 (No in step S1573), the control unit 605 takes an image when the time and date measured by the clock unit 604 agree with the imaging instruction time and date+clock time difference+timer wait time to make the image the specified timing image (step S1575). Thus, even when there is a gap between the time and dates respectively measured by the clock unit 604 and the clock unit 704, the operating terminal 20 is capable of obtaining and displaying the specified timing image taken by the imaging device 10 at the timing for imaging specified by the user to the operating terminal 20. The operating terminal 20 is capable of obtaining and displaying the specified timing image taken by the imaging device 10 at the timing for imaging specified by the user to the operating terminal 20 regardless of presence or length of the time difference taken for sending an imaging request from the operating terminal 20 to the imaging device 10.

Next, the control unit 605 sends the specified timing image to the authentication server 30 using the communication unit 602 (step S1576).

The authentication server 30 receives the specified timing image sent by the imaging device 10 using the data relay function and transfers the received specified timing image to the operating terminal 20 (step S1542).

The control unit 705 of the operating terminal 20 receives the specified timing image for storage in the storage unit 703 (step S1521).

In step S1522, the control unit 705 of the operating terminal 20 determines whether or not the current clock time measured by the clock unit 704 reaches the reservation end time and date included in the reservation information. When the determination result is positive (Yes in step S1522), the control unit 705 terminates the process. When the determination result is negative (No in step S1522), the process goes on to step S1512.

In step S1577, the imaging device 10 determines whether or not the current clock time measured by the clock unit 604 reaches the reservation end time and date included in the reservation information. When the determination result in step S1577 is positive (Yes in step S1577), the control unit 605 gives an instruction of end of imaging to the imaging unit 601. When receiving the instruction of end of imaging, the imaging unit 601 terminates image taking (step S1578).

When the determination result in step S1577 is negative (No in step S1577), the process goes on to step S1571.

<1-3-4. Authentication Determination Process>

Details of the authentication determination process by the imaging device 10 illustrated in step S1563 in FIG. 15 are described using FIG. 16.

FIG. 16 is a flow chart illustrating an example of a procedure of the authentication determination process. The control unit 605 of the imaging device 10 initializes a variable d used for the authentication determination process with a value 0 (step S1601).

The control unit 605 initializes a variable Td with total display time (step S1602).

Here, the total display time is obtained by adding all time periods indicated in the display time columns in the display history information 613. FIG. 9B is a diagram illustrating an example of contents of the display history information 613. When the display history information 613 has the contents indicated in FIG. 9B, the total display time is (300+600+200+700+400+500+200+300+600+200)=4000 milliseconds. The row identified by the display number corresponding to the display number information in the display history information 613 is an entry of the display history information 613.

Next, the control unit 605 determines whether or not Td is not less than display remaining time (step S1603). The display remaining time indicates for how long the displayed image has to remain. The display remaining time is, as an example, two seconds.

When Td is two seconds or more (Yes in step S1603), the variable d is incremented by 1 (step S1604), 1 is substituted to a value of variable r (step S1605), the variable Tr is initialized with the total imaging time (step S1606), and the process goes on to step S1631.

Here, the total imaging time is obtained by adding all imaging time periods included in each entry indicated in the imaging time column in the imaging history information 612. As an example, when the imaging history information 612 is the contents illustrated in FIG. 11, the total imaging time is (200+200+700+400+500+200+300)=2500 milliseconds.

In step S1603, when Td is less than two seconds (No in step S1603), the control unit 605 determines as authentication failure (step S1611) and terminates the process.

In step S1631, the control unit 605 assesses whether or not a taken image [r] agrees with a displayed image [d] and also an imaging time [r] agrees with a display time [d] (first assessment).

Here, the taken image [r] represents an image indicated by the image information corresponding to the entry including the imaging number having a value of r in the imaging history information 612. As an example, when the imaging history information 612 is the contents illustrated in FIG. 11, the taken image [1] represents an image indicated by the image information (red) associated with the imaging number of a value 1, that is, an image in red.

The displayed image [d] represents an image indicated by the image information associated with the entry including the display number having a value of d in the display history information 613. As an example, when the display history information 613 is the contents illustrated in FIG. 9B, the displayed image [1] represents an image indicated by the image information (blue) associated with the entry including the display number of a value 1, that is, an image in blue.

The imaging time [r] represents the imaging time associated with the entry including the imaging number having a value of r in the imaging history information 612. As an example, when the imaging history information 612 is the contents illustrated in FIG. 11, the imaging time [1] represents the imaging time associated with the entry including the imaging number of a value 1, that is, 200 milliseconds.

The display time [d] represents the display time associated with the entry including the display number having a value of d in the display history information 613. As an example, when the display history information 613 is the contents illustrated in FIG. 9B, the display time [1] represents the display time associated with the entry including the display number of a value 1, that is, 300 milliseconds. When the assessment result in step S1631 is positive (Yes in step S1631), variables i, j, and tt are initialized with a value 0 (step S1632). The variable tt represents total display time when the agreement of the image information and the agreement of the display time continue.

Next, the control unit 605 adds display time [r+i] to tt (step S1633), and the process goes on to step S1634.

When the assessment result in step S1631 is negative (No in step S1631), the process goes on to step S1671.

In step S1634, whether or not tt is two seconds or more is determined. When tt is two seconds or more (Yes in step S1634), the determination is made as authentication successful (step S1651) and the process is terminated. When tt is less than two seconds (No in step S1634), i is incremented by 1 (step S1635), j is incremented by 1 (step S1636), and the process goes on to step S1637.

In step S1637, the control unit 605 assesses whether or not a taken image [r+i] agrees with a displayed image [d+i] and also imaging time [r+i] agrees with display time [d+i] (second assessment). The process goes on to step S1633 when the assessment is positive (Yes in step S1637), and the process goes on to step S1671 when the assessment is negative (No in step S1637).

In step S1671, the control unit 605 determines whether or not Tr-imaging time [r] is not less than two seconds. When the determination is positive (Yes in step S1671), the imaging time [r] is subtracted from Tr (step S1672), r is incremented by 1 (step S1673), and the process goes on to step S1631.

When the determination is negative in step S1671 (No in step S1671), the process goes on to step S1691.

In step S1691, the control unit 605 determines whether or not d+1 is not more than a final display number. Here, the final display number is the greatest one among the display numbers described in the display history information 613. When the determination is positive in step S1691 (Yes in step S1691), the display time [d] is subtracted from Td (step S1692), and the process goes on to step S1603. When the determination is negative in step S1691 (No in step S1691), the determination is made as authentication failure (step S1693), and the process is terminated.

<1-3-5. One Example of Authentication Determination Process>

A case is considered below where the contents of the display history information 613 is as illustrated in FIG. 9B and the contents of the imaging history information 612 is as illustrated in FIG. 11.

In the case that the authentication determination process illustrated in FIG. 16 is carried out using the display history information 613 illustrated in FIG. 9B and the imaging history information 612 illustrated in FIG. 11, when the loop process in the illustration is carried out several times, the value of r becomes 2 and the value of d becomes 3 for carrying out step S1631.

At this time, a taken image [2] agrees with a displayed image [3] and also imaging time [2] agrees with display time [3], so that the determination is positive in step S1631 and the process in step S1632 and later is carried out.

As illustrated in FIGS. 9A and 11, the entry of the imaging history information 612 of the imaging number [2+i] has identical contents to the entry of the display history information 613 of the display number [3+i]. At this time, i is an integer between 0 and 5. Therefore, after positive determination is made in step S1631, the loop is repeated when the positive determination is made in steps S1633 through S1637, and when the entry of the imaging history information 612 of the imaging number [7] is determined to have the identical contents to the entry of the display history information 613 of the display number [8], positive determination is made in step S1637 and the process goes on to step S1633.

At this time, tt becomes 2.3 seconds in step S1633, so that positive determination is made in step S1634 and the process goes on to step S1651 for successful authentication.

FIG. 12 is a diagram to illustrate an example when comparing an authentication image with a taken image in the authentication determination process.

Display history information 1201 in FIG. 12 is an extraction of the display number, the image information, and the display time of the display history information 613. Imaging history information 1202 is an extraction of the imaging number, the image information, and the imaging time of the imaging history information 612.

When the operating terminal 20 displays all authentication images on the display unit 21 in accordance with the authentication image information 513, the authentication images are displayed for 300 milliseconds+600 milliseconds+200 milliseconds+700 milliseconds+400 milliseconds+500 milliseconds+200 milliseconds+300 milliseconds+600 milliseconds+200 milliseconds=4000 milliseconds.

However, what are actually taken by the imaging device 10 are taken images for 200 milliseconds+200 milliseconds+700 milliseconds+400 milliseconds+500 milliseconds+200 milliseconds+300 milliseconds=2500 milliseconds as illustrated in the imaging history information 612 (imaging history information 1202).

This represents that the operating terminal 20 does not display all of the authentication images for 4000 milliseconds described in the authentication image information 513 and displays only the authentication images for 2500 milliseconds or that, although displayed, the imaging device 10 is capable of detecting only the authentication images for 2500 milliseconds.

Here, a range 1203 in the display history information 1201 indicates a range that both the image information and the display time included in the entry continues to agree with the image information and the imaging time included in the entry in the imaging history information 1202.

A range 1204 in the imaging history information 1202 indicates a range that both the image information and the display time included in the entry continues to agree with the image information and the display time included in the entry in the display history information 1201.

When the addition of the display time (or imaging time) of the entry included in the range 1203 (or range 1204) is not less than time obtained by multiplying total time that is a total of the imaging time of the entries included in the imaging history information 1202 (as an example, 2500 milliseconds) by a predetermined ratio (as an example, 0.8) (authentication successful time), the determination is made as authentication successful (in other words, the operating terminal 20 has imaging authority). In the present embodiment, the total of the display time (imaging time) included in the range 1203 (and the range 1204) is 2300 seconds and is not less than the authentication successful time, so that the authentication becomes successful. The time obtained by multiplying the total time of the total imaging time included in the imaging history information 1202 (as an example, 2500 milliseconds) by a predetermined ratio (as an example, 0.8) (authentication successful time) is 2500×0.8=2000 milliseconds, in other words, 2 seconds. The value of two (seconds) is used as a value when determining the value of tt in step S1634 in FIG. 16.

In the example described above, sets of image information and display time of the entry included in the display history information 613 are compared respectively with sets of image information and display time of the entry included in the imaging history information 612, and when the total value of the display time (or imaging time) included in the entries agreeing with each other exceeds predetermined time, the authentication is considered to be successful (in other words, the operating terminal 20 is determined to have imaging authority).

However, the embodiment is not limited to this. The display history information 613 is used because a case is considered where the operating terminal 20 is not capable of displaying all the authentication images for 4000 milliseconds described in the authentication image information 513.

Therefore, as long as the operating terminal 20 is capable of displaying all the authentication images for 4000 milliseconds described in the authentication image information 513, a set of image information and display time of an entry included in the authentication image information 513 may also be used instead of the display history information 613.

It is as just described above that the authentication server 30 sends the authentication image information 513 both to the operating terminal 20 and the imaging device 10. Therefore, when using the authentication image information 513 instead of the display history information 613, it becomes not necessary that the operating terminal 20 sends the display history information 613 to the imaging device 10 via the authentication server 30.

In this case, it is desired to carry out the authentication determination process using an image taken by the imaging device 10 after receiving an authentication request from the operating terminal 20 until a time period corresponding to the total value of the display time included in the authentication image information 513 has passed.

2. Modification

Although the embodiment of a remote imaging system according to the present disclosure has just described above, the exemplified remote imaging system may also be modified as below and it is naturally understood that the present disclosure is not limited to the remote imaging system described in the above embodiment.

(1) Although the above embodiment uses the configuration where it is not possible to communicate between the imaging device 10 and the operating terminal 20, it may be configured to allow communication.

In addition, although the above embodiment is provided with the authentication server 30, the authentication server 30 having the reservation availability assessment function, the authentication image information generation function, the authentication application distribution function, and the data relay function, these functions may also be carried out by a device other than the authentication server 30. For example, the imaging device 10 may have the reservation availability assessment function, the authentication image generation function, and the authentication application distribution function. In this case, it is possible to omit the authentication server 30 from the remote imaging system 1.

(2) Although the above embodiment uses an image of single color as the authentication image, another image may also be used as the authentication image.

Figure 17:
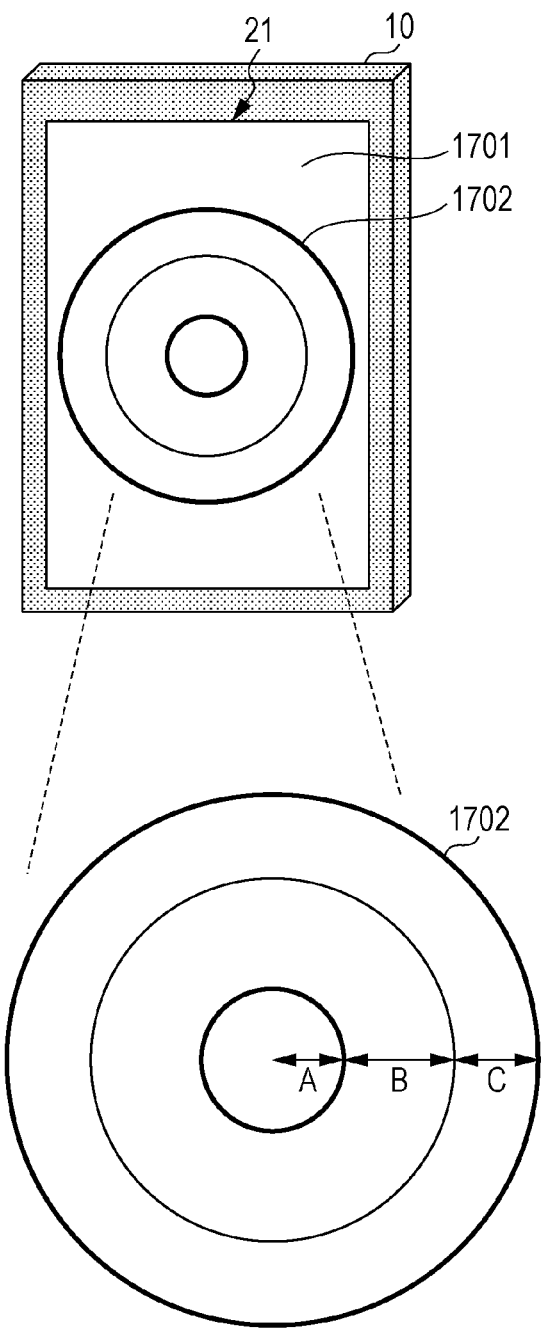
FIG. 17 is a diagram illustrating an example of an authentication image according to a modification.

FIG. 17 is a diagram illustrating an example of an authentication image according to a modification. For example, as the authentication image, an authentication image 1701 where a concentric circle 1702 is drawn may also be used as illustrated in FIG. 17. The concentric circle 1702 includes, as an example, a plurality (in the case of FIG. 17, three) of circles having different radii as illustrated in FIG. 17. The ratio of the radii of the three circles configuring the concentric circle 1702 is A to B to C, and A, B, and C are defined to be A+B+C=100.

FIG. 18A is a diagram illustrating an example of authentication image information according to a modification. In the present modification, the operating terminal 20 generates an authentication image based on authentication image information 1801 illustrated in FIG. 18A.

While the authentication image is expressed as color in the image information of the authentication image information 513 according to the above embodiment, in the authentication image information 1801 the authentication image is expressed by the ratios A, B, and C of the radii described above. For example, in the first entry of the authentication image information 1801, A=20%, B=50%, and C=30% are described as the image information.

Referring to the first entry, the operating terminal 20 generates the authentication image 1701 in which three concentric circles 1702 having the radius ratios of 20% to 50% to 30%.

The control unit 705 records information indicating, every time the authentication image 1701 corresponding to one entry is displayed, from when and until when the authentication image 1701 is displayed as display history information 1802. FIG. 18B is a diagram illustrating an example of contents of the display history information 1802.

The items other than the image information in the authentication image information 1801 are not different from the description on the authentication image information 513. The authentication image information 1801 may process the process other than the authentication image generation in a similar manner to be carried out for the authentication image information 513 described above.

In the meanwhile, the imaging device 10 detects an authentication image from a taken image by the imaging history information generation function. Specifically, the imaging device 10 detects a frame of a display by a number plate detecting technique similar to the above embodiment. Next, the imaging device 10 calculates the radius ratios A, B, and C of the concentric circles drawn in the display frame using a known image analysis technique.

Next, regarding the authentication image having an identical radius ratio of the concentric circles detected from the taken image in a continuous shooting order (hereinafter, referred to as "an identical ratio authentication image group"), the imaging device 10 generates image information indicating the ratio (A, B, and C), imaging time and date information representing a period in which the identical ratio authentication image group is taken by the first time and date and the last time and date, and imaging time representing time represented by the imaging time and date information. The authentication images having an identical radius ratio of concentric circles are the authentication images when the respective values are same between the plurality of authentication images (A, B, and C).

Then, the control unit 605 generates imaging history information 1901, illustrated in FIG. 19 as an example, having information on one identical ratio authentication image group as one entry for storage in the storage unit 603.

FIG. 19 is a diagram illustrating an example of the imaging history information 1901 according to a modification.

When using an image where such concentric circles are drawn as the authentication image, the three radius ratios configuring the concentric circles does not change all that much in an authentication image that is taken by the imaging device 10 even when the display surface of the display unit 21 of the operating terminal 20 is somewhat angled and is not directed to the front to the direction of the lens of the imaging unit 601 of the imaging device 10. That way, it is possible that the accuracy of authentication is not affected by the angle between the display surface of the display unit 21 and the direction of the lens of the imaging unit 601.

Although a number plate detecting technique is used to detect an authentication image from a taken image in the present modification and the above embodiment, it may be a technique capable of detecting a rectangular area from an image and specifying the display frame.

(3) Although a user inputs the desired time and date in the operating terminal 20 regarding the reservation request function of the operating terminal 20 in the above embodiment, the authentication server 30 may also notify the operating terminal 20 in advance of unreserved one or more time and dates and the user may select one of the notified time and dates to send it to the authentication server 30. Thus, the notification of reservation failure to the operating terminal 20 is reduced. Therefore, the user does not have to input desired time and date other than the desired time and date of the failed reservation again and efforts of the user is reduced.

In the above embodiment, the authentication server 30 is configured to accept an authentication request from the operating terminal 20 at arbitrary timing after the reservation start time and date of the operating terminal 20. However, the authentication server 30 may also retain information on a period to accept an authentication request from the operating terminal 20 and allow process for authority authentication.

In this case, even when the authentication server 30 accepts an authentication request from the operating terminal 20 in a period other than a predetermined period, the authentication server 30 does not carry out process for authority authentication.

The predetermined period may be provided between the reservation start time and date and the reservation end time and date of the operating terminal 20 and may also be provided before the reservation start time and date of the operating terminal 20.

According to this configuration, it is possible to limit an operating terminal to subject to authentication authority in a certain period and to give imaging authority using a camera to one.

When configured in such a manner, it is desired that the authentication server 30 notifies the operating terminal 20 of allowing process for authority authentication when it becomes the start time and date of the predetermined period.

(4) In the above embodiment, no particular descriptions are given to identifiers and the like to identify each device, such as the operating terminals 20, the imaging devices 10, and the authentication server 30. However, each device recognizes an identifier and the like of devices to be communication counterparts that are identified by a device ID, an IP address, and the like in advance and is capable of communicating with each other using these identifiers and the like.

(5) Although the imaging device 10 is described to take a still image in the above embodiment, the imaging device 10 may also take a video image.

(6) Although either authentication process using an image of single color or authentication process using an image where concentric circles are drawn as the authentication image is carried out in the above embodiment and the modification, authentication approaches with a plurality of types of authentication images may also be used in combination.

For example, firstly, authentication process using an image of single color as the authentication image may be carried out, and when the authentication is failed, authentication process using an image where concentric circles are drawn may also be carried out. In this case, when authentication process using an image where concentric circles are drawn is successful, the authentication is determined as successful.

In such a manner, it is possible to improve the accuracy of authentication not to obtain a wrong authentication result even in an environment where it is not possible to correctly recognize a color on the authentication image of single color, for example.

For example, in an environment such as the lighting is colored, there is a possibility that the imaging device 10 detects a wrong color as the color of the authentication image. In this case, the authentication is failed, but then the imaging device 10 finally determines as authentication successful when the authentication using an image where concentric circles are drawn is successful. Thus, it is possible to prevent a decrease in authentication accuracy even when authentication is carried out in an environment where it is not possible to correctly recognize the color.

(7) Although an image of single color is used as the authentication image in the above embodiment, the white balance is sometimes off balance due to the influence of external light in the imaging unit 601 of the imaging device 10. When the imaging unit 601 has a color correction unit to correct the white balance, the color correction unit is capable of correcting the white balance, by taking a white image, utilizing the taken image.

Therefore, in display schedule information, the authentication image to be displayed first may be defined as white, not randomly determining the color. Then, while the first authentication image is displayed, the imaging unit 601 carries out imaging to carry out color correction to enable recognition that the authentication image is white. Thus, it is possible to improve the accuracy of recognition of the color of the authentication image and further to improve the accuracy of authentication in the authentication process.

(8) Although it is possible to carry out start displaying the authentication image by the display unit 21 of the operating terminal 20 at the same time of start taking an image by the imaging device 10 in the above embodiment, the imaging device 10 may also define start of imaging to be a little delayed from the start of displaying the authentication image on the display unit 21 of the operating terminal 20. In this case, it is possible to increase the probability of including any authentication image in a taken image taken by the imaging device 10. In such a manner, a taken image that does not include an authentication image and is useless for authentication does not have to be taken and retained. It is also possible to reduce the opportunities of error process when an authentication image is not included.

(9) Although the imaging device 10 determines whether or not to terminate the imaging based on whether or not the current clock time measured by the clock unit 604 reaches the reservation end time and date included in the reservation information in step S1577 of the remote imaging process in the above embodiment, it may also determine based on other conditions. For example, a number of possible shots is determined in accordance with the amount of fee that a user pays and the number of specified timing images sent in accordance with imaging requests from the operating terminal 20 is counted, and end of imaging may be determined when the counted number reaches the number of possible shots.

(10) In the above embodiment, in the camera use schedule information, the time and date information is associated with the operating terminal ID. That is, the authority for use of the imaging device is given to the operating terminal. However, not limited to this, the authority for use may also be given to a user. Specifically, in the camera use schedule information, the time and date information is associated with a user ID to identify a user. The user also inputs a user ID of him/herself to the operating terminal. Then, in the reservation process, the operating terminal sends a reservation request including the desired time and date information and the user ID to the authentication server 30 (equivalent to step S1301 above). The authentication server 30 determines reservation availability based on whether or not the user ID is stored in association in the time and date information of the camera use schedule information that agrees with the desired time and date information included in the reservation request. Later in the reservation process, the authentication server 30 carries out the process using the user ID instead of the operating terminal ID.

In the case of this mode, the user given with the authority for use is capable of carrying out process, such as display of the authentication image, using an arbitrary operating terminal not limited to a specific operating terminal.

In the reservation process, the reservation availability may also be determined using both the operating terminal ID and the user ID.

(11) It is also possible to record a control program of program codes in a machine language or a high level language to cause a processor of each device and various circuits connected to the processor to execute process for each function described in the above embodiment and the like in a recording medium or to distribute and spread it via various communication channels and the like.

Each function described in the above embodiment includes, for example, the reservation availability assessment function, the authentication image generation function, the authentication application distribution function, the data relay function, the imaging history information generation function, the authentication determination function, the clock time difference calculation function, the imaging control function, the reservation request function, the image display control function, and the imaging operation control function.

Such recording medium includes an IC card, a hard disk, an optical disk, a flexible disk, a ROM, a flash memory, and the like. The control program that is distributed and spread is served for utilization by being stored in a memory and the like that may be read by a processor, and each function as described in each embodiment is achieved by executing the control program by the processor. In addition to direct execution of the control program, the processor may also execute it by compiling or by an interpreter.

(12) Each functional component described in the above embodiment (such as the display unit 21, the communication unit 501, the storage unit 502, the control unit 503, the clock unit 504, the imaging unit 601, the communication unit 602, the storage unit 603, the clock unit 604, the control unit 605, the input unit 701, the communication unit 702, the storage unit 703, the clock unit 704, and the control unit 705) may be achieved as a circuit to execute the function and may also be achieved by executing a program by one or a plurality of processors.

Each functional component described above is typically achieved by an LSI, which is an integrated circuit. They may be separated chips and may also be an integrated chip to include all or part. Although referred to as an LSI here, it may also be referred to as an IC, a system LSI, a super LSI, and an ultra LSI depending on the level of integration. The method for circuit integration is not limited to an LSI and it may also be achieved by a dedicated circuit or a general purpose processor. After manufacturing an LSI, a field programmable gate array (FPGA) that may be programmed or a reconfigurable processor that may reconfigure the connection and configuration of circuit cells inside the LSI may also be utilized. Further, when there appears a technique for circuit integration that replaces LSIs due to the progress of the semiconductor technique or another derived technique, the functional blocks may also be integrated naturally using such technique. As a possibility, there is application of a biotechnology and the like.

(13) The above embodiment and each modification may be combined partially.

3. Supplementation

Further descriptions are given below to a remote imaging system, a remote imaging method, a configuration of a remote imaging control device as an embodiment of the present disclosure, modifications thereof, and the effects.

A remote imaging method according to an embodiment of the present disclosure is a remote imaging method executed by an imaging system carrying out imaging by a camera placed at an imaging spot, the method including: continuously imaging a person having an operating terminal in the imaging spot by the camera; obtaining a display content displayed on a display of the operating terminal from a plurality of taken images taken by the continuous imaging; determining whether or not the operating terminal has imaging authority using the camera using the obtained display content; and sending a specified timing image taken by the camera at timing for imaging specified by the operating terminal determined to have the imaging authority to the operating terminal. The determining further includes assessment of whether or not the obtained display content and temporal transition of the obtained display content make a predetermined pattern is carried out, and when an assessment result is positive, determining determines that the operating terminal has the imaging authority, and the predetermined pattern is to display each of a plurality of authentication images on the display of the operating terminal for display time defined in advance in an order defined in advance.

According to this configuration, it is possible to enable imaging with a camera as secure as possible only when an operating terminal that is determined to have imaging authority is present within an imaging region of the camera.

The camera has a clock and a storage unit, the operating terminal has a clock, and the remote imaging method may include: receiving, from the operating terminal, start display time and date measured by the clock belonging to the operating terminal when start displaying each of the plurality of authentication images by the operating terminal; storing the plurality of taken images in association with taken time and date measured by the clock belonging to the camera when taking each of the plurality of taken images in the storage unit belonging to the camera; and calculating a clock time difference indicating a gap between time and date measured by the clock belonging to the camera and time and date measured by the clock belonging to the operating terminal using the start display time and date of one image and the taken time and date of the one image.

The continuously imaging may continuously image the person having the operating terminal at a defined time interval by the camera. The remote imaging method may further include calculating a difference between the start display time and date of the one authentication image and oldest taken time and date among the taken time and date stored in association with the taken image of taking the one authentication image as the clock time difference.

The remote imaging method may further include receiving, from the operating terminal, an imaging instruction including time and date at specified timing to be time and date measured by the clock belonging to the operating terminal at the timing for imaging, in which the specified timing image may have the associated taken time and date among the plurality of taken images stored in the storage unit belonging to the camera agreeing with time and date obtained by adding the time and date at specified timing to the clock time difference.

According to this configuration, an operating terminal is capable of obtaining and displaying a specified timing image that is taken by a camera at timing for imaging specified by a user to the operating terminal even when there is a gap between time and dates respectively measured by a clock that the camera has and a clock that the operating terminal has.

The timing for imaging is time and date after passing predetermined delay time from time and date measured by the clock belonging to the operating terminal when an imaging operation to the operating terminal is made by the person, and the remote imaging method may further include taking an image by the camera as the specified timing image when the time and date measured by the clock belonging to the camera agrees with the time and date obtained by adding the time and date at specified timing to the clock time difference.

The remote imaging method may further include notifying the operating terminal of an arrival of the timing for imaging by the camera.

According to this configuration, it is possible to let a user prepare for picture imaging by posing and the like for a predetermined delayed time period after an imaging operation. Then, it is possible to provide the image taken by the camera to the user as a specified timing image when timing for imaging arrives.

The remote imaging method may further include: storing a plurality of information items having a set of image information indicating a content of the authentication image and display time information indicating a length of the display time to display the authentication image in association with display number information indicating the order of displaying the authentication image using the set in a storage unit of the operating terminal; carrying out process of generating an authentication image of the content indicated in the image information included in the set corresponding to a display number indicated in the display number information and displaying the generated authentication image on the display of the operating terminal for the display time defined in the display time information making the set with the image information in the order of the display number indicated by the display number information; and storing imaging history information, by generating it, including the set of the display content and the imaging time information indicating the length of the imaging time of continuously imaging the display content and imaging number information indicating an order of detecting the display content corresponding to the set in the storage unit of the camera for each different display content regarding the time transition of the display content of the display of the operating terminal detected from the plurality of taken images, in which the determining may include first assessment assessing whether or not any of the sets of the display content of the display and the imaging time included in the imaging history information is identical to the set of the content of the image information and the display time information stored in the operating terminal and second assessment assessing whether or not the display content of the display and the imaging time included in a set corresponding to imaging number information following the imaging number information of the set assessed as identical are continuously assessed as identical to the image information and the display time information included in a set corresponding to display number information following the display number information of the set assessed as identical.

According to this configuration, it is possible to appropriately carry out determination whether or not an operating terminal has imaging authority.

In a case that the second assessment is positive, the determining may determine that the operating terminal has the imaging authority when a total value of the imaging time indicated in the imaging time information included in each of a plurality of sets having the continuous imaging numbers assessed as identical is more than a predetermined value.

According to this configuration, it is possible to adjust the accuracy when determining whether or not an operating terminal has imaging authority by adjusting a predetermined value.

The imaging system may include an authentication server, the authentication server may send the image information, the display time information, and the display number information associated with each set included in each of the plurality of sets to the operating terminal and the camera, and each of the operating terminal and the camera may receive the set of the image information and the display time information being sent and the display number information corresponding to the set for storage.

The authentication server may generate a plurality of sets of the image information and the display time information to be sent and the display number information associated with each set.

The camera may send the sets of the image information and the display time information and the display number information associated with each set and the operating terminal may receive the image information, the display time information, and the display number information being sent for storage in the storage unit belonging to the operating terminal.

According to this configuration, it is possible to appropriately carry out determination of whether or not an operating terminal has imaging authority.

The content of the authentication image indicated in the image information and the length of the display time indicated in the display time information are specified randomly, in two sets corresponding to continuous display numbers, a content indicated in image information corresponding to one display number and a content indicated in image information corresponding to the other display number may be different.

According to this configuration, it is possible to uniquely distinguish respective sets of image information and image display time, so that it is possible to prevent wrong determination in determination of whether or not an operating terminal has imaging authority caused by confusion of each set.

The authentication image is a color image of single color, and colors indicated by the content of the image information included in the two sets having continuous display numbers may be different from each other.

The authentication image may be an image where a plurality of concentric circles having different radii are drawn.

According to this configuration, it is possible to suppress a degree of a decrease in accuracy of detecting an authentication image due to being angled lower than a case of using an image where a QR Code® or a character is drawn as an authentication image even when a screen of an operating terminal and a direction of a lens of a camera are somewhat angled.

A first authentication image among a plurality of authentication images generated by a plurality of image information items is a white image, the camera is provided with a color corrector, and the remote imaging method may further include color correcting of the first authentication image using the color corrector to recognize white correctly when the camera takes the first authentication image.

According to this configuration, it is possible to improve accuracy of recognizing each an authentication image and to improve accuracy of determination of whether or not an operating terminal has imaging authority.

The authentication image is any of a color image of single color and a concentric circle image being an image where a plurality of concentric circles having different radii are drawn, the determination of whether or not to have the imaging authority is carried out using any one of the color image of single color and the concentric circle image in the determination of whether or not to have the imaging authority, and the determination of whether or not to have the imaging authority may be retried using the other of the color image of single color and the concentric circle image when the determination of whether or not to have the imaging authority is failed.

According to this configuration, it is possible to prevent a decrease in determination accuracy of whether or not to have the overall imaging authority even in an environment where determination accuracy of whether or not to have the imaging authority by one approach becomes low.

A period to carry out the determination of whether or not to have the imaging authority for the operating terminal is retained, and the determination of whether or not to have the imaging authority regarding the operating terminal may not be carried out other than the period.

The remote imaging method may include notifying the operating terminal of carrying out the determination of whether or not to have the imaging authority in the period.

According to this configuration, it is possible to limit an operating terminal that is subjected to authentication authority and to which imaging authority using a camera to one in a certain period.

At least any one of the obtaining the display content, the determining, and the sending may be carried out by a processor.

A remote imaging control device according to an embodiment of the present disclosure is a remote imaging control device controlling imaging with a camera placed at an imaging spot. The camera carries out continuously imaging of a person having an operating terminal in the imaging spot. The remote imaging control device includes: an obtainer obtaining a display content displayed on a display of the operating terminal from a plurality of taken images taken by the continuous imaging; a determiner carrying out determination of whether or not the operating terminal has imaging authority using the camera using the obtained display content; and a sender sending a specified timing image taken by the camera at timing for imaging specified by the operating terminal determined to have the imaging authority to the operating terminal. The determiner assesses whether or not the obtained display content and temporal transition of the obtained display content make a predetermined pattern is carried out, and when an assessment result is positive, the determiner determines that the operating terminal has the imaging authority, and the predetermined pattern is to display each of a plurality of authentication images on the display of the operating terminal for display time defined in advance in an order defined in advance.

According to this configuration, it is possible to enable imaging with a camera as secure as possible only when an operating terminal is present within an imaging region of the camera.

Here, the remote imaging control device corresponds to a configuration to include portions eliminating the imaging unit 601 in the imaging device 10, the communication unit 501, the storage unit 502, and the control unit 503 of the authentication server 30 in the above embodiment for carrying out the present disclosure.

At least any one of the obtainer, the determiner, and the sender may include a processor.

A remote imaging method and a remote imaging control device according to the present disclosure let a user that has an authorized operating terminal use a camera placed at an imaging spot in order and it is possible to provide an image that is taken by the camera at timing specified by the user using the operating terminal regardless of presence of a communication delay between the camera and the operating terminal, so that it is possible to apply them to taking a memorial photo in a tourist attraction, a theme park, and the like.

What is claimed is:

1. A remote imaging method executed by an imaging system configured to perform imaging with a camera provided at an imaging area, the method comprising:
    continuously imaging a person having an operating terminal at the imaging area with the camera;
    obtaining a display content displayed on a display of the operating terminal from a plurality of taken images taken by the continuously imaging;
    determining whether or not the operating terminal has imaging authority to use the camera using the display content obtained; and
    sending a specified timing image taken by the camera at a time for imaging specified by the operating terminal determined to have the imaging authority to the operating terminal,
    wherein the determining further includes assessing whether or not the display content obtained and a temporal transition of the display content obtained make a predetermined pattern, and when an assessment result is positive, the determining determines that the operating terminal has the imaging authority,
    wherein the predetermined pattern includes a display of each of a plurality of authentication images on the display of the operating terminal for a pre-defined display time and a pre-defined order, and
    wherein the remote imaging method further comprises:
    receiving, from the operating terminal, a start display time and date measured by a clock of the operating terminal at a start of displaying each of the plurality of authentication images by the operating terminal;
    storing, in a storage of the camera, the plurality of taken images in association with a taken time and date measured by a clock of the camera when taking each of the plurality of taken images; and
    calculating a clock time difference indicating a gap between a time and date measured by the clock of the camera and a time and date measured by the clock of the operating terminal using the start display time and date of one image and the taken time and date of the one image.

2. The remote imaging method according to claim 1, wherein
    the continuously imaging continuously images the person having the operating terminal at a defined time interval by the camera, and
    the remote imaging method further comprises:
    calculating a difference between the start display time and date of one authentication image and an oldest taken time and date among the taken time and date stored in association with the taken image of taking the one authentication image as the clock time difference.

3. The remote imaging method according to claim 1, further comprising:
    receiving, from the operating terminal, an imaging instruction including a time and date at specified timing to be a time and date measured by the clock of the operating terminal at the timing for imaging, wherein
    the specified timing image has an associated taken time and date among the plurality of taken images stored in the storage of the camera agreeing with a time and date obtained by adding the time and date at specified timing to the clock time difference.

4. The remote imaging method according to claim 1, wherein
    the timing for imaging is a time and date after passing a predetermined delay time from the time and date measured by the clock belonging to the operating terminal when an imaging operation to the operating terminal is made by the person, and
    the remote imaging method further includes:
    taking an image by the camera as the specified timing image when the time and date measured by the clock belonging to the camera agrees with the time and date obtained by adding the time and date at specified timing to the clock time difference.

5. The remote imaging method according to claim 4, further comprising:
    notifying a user of a starting time for imaging.

6. The remote imaging method according to claim 1, further comprising:
    storing a plurality of items of information having a set of image information indicating a content of the authentication image and display time information indicating a length of the display time to display the authentication image in association with display number information indicating an order of displaying the authentication image using the set in a storage of the operating terminal;
    generating an authentication image of the content indicated in the image information included in the set corresponding to a display number indicated in the display number information and displaying the generated authentication image on the display of the operating terminal for the display time defined in the display time information making the set with the image information in the order of the display number indicated by the display number information; and generating and storing imaging history information including the set of the display content and the imaging time information indicating a length of the imaging time of continuously imaging the display content and imaging number information indicating an order of detecting the display content corresponding to the set in the storage of the camera for each different display content regarding the time transition of the display content of the display of the operating terminal detected from the plurality of taken images, wherein the determining includes:

first assessment assessing as to whether or not any of the sets of the display content of the display and the imaging time included in the imaging history information is identical to the set of the content of the image information and the display time information stored in the operating terminal and second assessment assessing as to whether or not the display content of the display and the imaging time included in a set corresponding to imaging number information following the imaging number information of the set assessed as identical are continuously assessed as identical to the image information and the display time information included in a set corresponding to display number information following the display number information of the set assessed as identical.

7. The remote imaging method according to claim 6, wherein, when the second assessment is positive, the determining determines that the operating terminal has the imaging authority when a total value of the imaging time indicated in the imaging time information included in each of a plurality of sets having the continuous imaging numbers assessed as identical is more than a predetermined value.

8. The remote imaging method according to claim 6, wherein the imaging system includes an authentication server, the authentication server sends the image information, the display time information, and the display number information associated with each set included in each of the plurality of sets to the operating terminal and the camera, and each of the operating terminal and the camera receives the set of the image information and the display time information being sent and the display number information corresponding to the set for storage.

9. The remote imaging method according to claim 8, wherein the authentication server generates a plurality of sets of the image information and the display time information to be sent and the display number information associated with each set.

10. The remote imaging method according to claim 6, wherein the camera sends the sets of the image information and the display time information and the display number information associated with each set and the operating terminal receives the image information, the display time information, and the display number information being sent for storage in the storage belonging to the operating terminal.

11. The remote imaging method according to claim 6, wherein the content of the authentication image indicated in the image information and the length of the display time indicated in the display time information are specified randomly, in two sets corresponding to continuous display numbers, a content indicated in image information corresponding to one display number and a content indicated in image information corresponding to the other display number are different.

12. The remote imaging method according to claim 11, wherein the authentication image is a color image of single color, and colors indicated by the content of the image information included in the two sets having continuous display numbers are different from each other.

13. The remote imaging method according to claim 11, wherein the authentication image is an image where a plurality of concentric circles having different radii are drawn.

14. The remote imaging method according to claim 6, wherein a first authentication image among a plurality of authentication images generated by a plurality of image information items is a white image, the camera is provided with a color corrector, and the remote imaging method further includes:

color correcting of the first authentication image using the color corrector to recognize white correctly when the camera takes the first authentication image.

15. The remote imaging method according to claim 6, wherein the authentication image is any of a color image of single color and a concentric circle image being an image where a plurality of concentric circles having different radii are drawn, the determination of whether or not to have the imaging authority is performed using any one of the color image of single color and the concentric circle image in the determination of whether or not to have the imaging authority, and the determination of whether or not to have the imaging authority is retried using the other of the color image of single color and the concentric circle image when the determination of whether or not to have the imaging authority is failed.

16. The remote imaging method according to claim 1, wherein a period to carry out the determination of whether or not to have the imaging authority for the operating terminal is retained, and the determination of whether or not to have the imaging authority regarding the operating terminal is not carried out other than the period.

17. The remote imaging method according to claim 16, comprising:

notifying the operating terminal of performing the determination of whether or not to have the imaging authority in the period.

18. The remote imaging method according to claim 1, wherein at least any one of the obtaining the display content, the determining, and the sending, the receiving, the storing, and the calculating is performed by a processor.

19. A remote imaging control device controlling imaging with a camera placed at an imaging area, the camera configured to perform continuous imaging of a person having an operating terminal in the imaging area, the remote imaging control device comprising:

an obtainer obtaining a display content displayed on a display of the operating terminal from a plurality of taken images taken by the continuous imaging;

a determiner carrying out determination of whether or not the operating terminal has imaging authority to use the camera using the display content obtained; and a sender sending a specified timing image taken by the camera at time for imaging specified by the operating terminal determined to have the imaging authority to the operating terminal, wherein the determiner assesses whether or not the display content obtained and a temporal transition of the display content obtained make a predetermined pattern, and when an assessment result is positive, the determiner determines that the operating terminal has the imaging authority, wherein the predetermined pattern includes a display of each of a plurality of authentication images on the display of the operating terminal for a pre-defined display time a pre-defined order, and wherein the remote imaging control device further comprises:

a receiver that receives, from the operating terminal, a start display time and date measured by a clock of the operating terminal at a start of displaying each of the plurality of authentication images by the operating terminal;

a storage that stores the plurality of taken images in association with a taken time and date measured by a clock of the camera when taking each of the plurality of taken images in a storage of the camera; and a calculator that calculates a clock time difference indicating a gap between a time and date measured by the clock belonging to the camera and a time and date measured by the clock of the operating terminal using the start display time and date of one image and the taken time and date of the one image.

20. The remote imaging control device according to claim 19, wherein at least any one of the obtainer, the determiner, the sender, the receiver, and the calculator includes a processor.

21. A remote imaging control device controlling imaging with a camera placed at an imaging area, the camera configured to perform continuous imaging of a person having an operating terminal in the imaging area, the remote imaging control device comprising:

a processor; and a memory including instructions that, when executed by the processor, cause the processor to perform operations including:

obtaining a display content displayed on a display of the operating terminal from a plurality of taken images taken by the continuous imaging;

determining whether or not the operating terminal has imaging authority to use the camera using the display content obtained; and sending a specified timing image taken by the camera at time for imaging specified by the operating terminal determined to have the imaging authority to the operating terminal, wherein the determining assesses whether or not the display content obtained and a temporal transition of the display content obtained make a predetermined pattern, and when an assessment result is positive, the determiner determines that the operating terminal has the imaging authority, wherein the predetermined pattern includes a display of each of a plurality of authentication images on the display of the operating terminal for a pre-defined display time and a pre-defined order defined, and wherein the operations further include:

receiving, from the operating terminal, a start display time and date measured by a clock of the operating terminal at a start of displaying each of the plurality of authentication images by the operating terminal;

storing the plurality of taken images in association with a taken time and date measured by a clock of the camera when taking each of the plurality of taken images in a storage of the camera; and calculating a clock time difference indicating a gap between a time and date measured by the clock belonging to the camera and a time and date measured by the clock of the operating terminal using the start display time and date of one image and the taken time and date of the one image.

\* \* \* \* \*